United States Patent
Mutsuno

(10) Patent No.: US 11,597,214 B2
(45) Date of Patent: Mar. 7, 2023

(54) PRINTING SYSTEM HAVING CONVEYANCE PATHS TO DISCHARGE DESTINATIONS

(71) Applicant: CANON KABUSHIKI KAISHA, Tokyo (JP)

(72) Inventor: Masahiro Mutsuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/495,650

(22) Filed: Oct. 6, 2021

(65) Prior Publication Data

US 2022/0126601 A1 Apr. 28, 2022

(30) Foreign Application Priority Data

Oct. 23, 2020 (JP) .............................. JP2020-177985

(51) Int. Cl.
*B41J 3/60* (2006.01)
*G06F 3/12* (2006.01)
*H04N 1/00* (2006.01)

(52) U.S. Cl.
CPC .............. *B41J 3/60* (2013.01); *G06F 3/1204* (2013.01); *H04N 1/00204* (2013.01)

(58) Field of Classification Search
CPC ....... B41J 3/60; G06F 3/1204; H04N 1/00204
USPC ........................................................ 358/471
See application file for complete search history.

(56) References Cited

U.S. PATENT DOCUMENTS

| | | | |
|---|---|---|---|
| 9,955,030 B2* | 4/2018 | Mutsuno .............. | H04N 1/0032 |
| 2004/0190057 A1* | 9/2004 | Takahashi ............. | G06F 3/1205 |
| | | | 358/1.15 |
| 2016/0052320 A1* | 2/2016 | Mutsuno ............... | B65H 39/10 |
| | | | 700/219 |
| 2017/0134612 A1* | 5/2017 | Mita .................. | G06K 15/1874 |

FOREIGN PATENT DOCUMENTS

JP 2013108770 A 6/2013

* cited by examiner

*Primary Examiner* — Allen H Nguyen
(74) *Attorney, Agent, or Firm* — Canon U.S.A., Inc. I.P. Division

(57) ABSTRACT

A printing system includes a printing unit, a determination unit, and a switching unit. The printing unit prints an image on a recording medium. The determination unit compares a prestored reference image and a read image corresponding to a reading result of a printed document in which the image is printed on the recording medium and determines whether a result of the comparison satisfies a predetermined condition. The switching unit switches a discharge destination of the recording medium based on a result of the determination. The switching unit switches a conveyance path of the recording medium based on whether the determination is performed.

11 Claims, 21 Drawing Sheets

FIG.6A

REGISTRATION OF CORRECT IMAGE

INVOICE ~601

READING HAS BEEN COMPLETED.
REGISTER READ IMAGE
AS CORRECT IMAGE?

- SET INSPECTION SKIP AREA ~604
- REGISTER ~605
- CANCEL ~606

◁ 1/1 PAGE ▷   FRONT ~603

INSPECTION SKIP AREA SETTING

INVOICE

612 POSITION
613 SIZE OF AREA

△  ◁ ▷  △ ◁ ▷
▽        ▽

~601

INSPECTION SKIP AREA ~611

- REGISTER ~614
- FURTHER REGISTER ANOTHER INSPECTION SKIP AREA ~615
- CANCEL ~616

FIG.10

| INSPECTION RESULT | |
|---|---|
| TIME | 3/6 10:10 |
| JOB NAME | INVOICE |
| NUMBER OF INSPECTED SHEETS | 1000 |
| NUMBER OF PASSED SHEETS | 986 |
| NUMBER OF REJECTED SHEETS | 14 |

1001

PREVIOUS JOB ◁  1003  NEXT JOB ▷
1/3 JOB

SELECT JOB TO BE EXECUTED.

| JOB NAME | DATE AND TIME OF RECEPTION | |
|---|---|---|
| ☑ INVOICE | 20XX/MM/DD | ~1201 |
| ☑ QUOTATION | 20XX/MM/DD | |
| ☑ BOOKLET | 20XX/MM/DD | |
| ☐ WRITTEN APPROVAL | 20XX/MM/DD | |
|  |  | |
|  |  | |

NEXT ~1202   CANCEL ~1203

FIG.13

INSPECTION JOB SETTING

NUMBER OF SETS OF JOB — 1301

| | | 1302 | 1303 |
|---|---|---|---|
| INVOICE | 300 | △▽ | PRINT 1 SET |
| QUOTATION | 100 | △▽ | PRINT 1 SET |
| BOOKLET | 500 | △▽ | PRINT 1 SET |

1305 — FEED CORRECT IMAGE FROM INSERTER

| | | |
|---|---|---|
| DISCHARGE DESTINATION | FINISHER | ~1304 |
| DISCHARGE DESTINATION OF SHEETS REJECTED IN INSPECTION | ESCAPE TRAY | |

START PRINTING ~1306

1307 — CANCEL

PRINTING SYSTEM HAVING CONVEYANCE PATHS TO DISCHARGE DESTINATIONS

BACKGROUND

Field

The present disclosure relates to a printing system, an information processing apparatus, and an information processing method.

Description of the Related Art

There has been known a printing system that enables an inspection apparatus to inspect a printed document obtained by a printing apparatus performing printing onto a recording medium (hereinafter, referred to as a "sheet") such as paper, during the conveyance of the printed document. In the inspection of a sheet (e.g., printed document), for example, by reading an image on a conveyed sheet and comparing the read image with a reference image pre-registered in the inspection apparatus, the inspection apparatus determines whether the sheet is normal, based on a result of the comparison. The inspection apparatus detects a partially missing barcode or ruled line, image deficiency, a printing failure, page deficiency, and a color shift, for example. Japanese Patent Application Laid-Open No. 2013-108770 discusses an example of a printing system that enables a printed document to be inspected using an inspection apparatus.

For inspecting a printed document, there has been sometimes introduced a structure of making a discharge destination of each sheet controllable so as to prevent a sheet rejected in an inspection due to deficiency detected in an image on the sheet (inspection NG), from being mixed with a sheet that includes no deficiency detected in an image, and has passed in an inspection (inspection OK).

On the other hand, when a distance between the inspection apparatus and a discharge destination of a sheet determined by the inspection apparatus to be inspection no good (NG) is relatively close, it sometimes becomes too late to control a discharge destination of the sheet after the sheet is determined to be inspection NG.

SUMMARY

The present disclosure is directed to a technique capable of controlling a discharge destination of a printed document that is suitable for an inspection result of the printed document, in a more desirable mode.

According to an aspect of the present disclosure, a printing system includes a printing unit configured to print an image on a recording medium, a determination unit configured to compare a prestored reference image and a read image corresponding to a reading result of a printed document in which the image is printed on the recording medium and to determine whether a result of the comparison satisfies a predetermined condition, and a switching unit configured to switch a discharge destination of the recording medium based on a result of the determination, wherein the switching unit switches a conveyance path of the recording medium based on whether the determination is performed.

Further features of the present disclosure will become apparent from the following description of exemplary embodiments with reference to the attached drawings.

BRIEF DESCRIPTION OF THE DRAWINGS

FIGS. 6A and 6B each illustrate an example of a screen to be displayed corresponding to a reading result of a reference image.

FIG. 10 illustrates an example of a confirmation screen of an inspection result.

FIG. 12 illustrates an example of a selection screen of an inspection job.

FIG. 13 illustrates an example of a setting screen of an inspection job.

DESCRIPTION OF THE EMBODIMENTS

Figure 1:
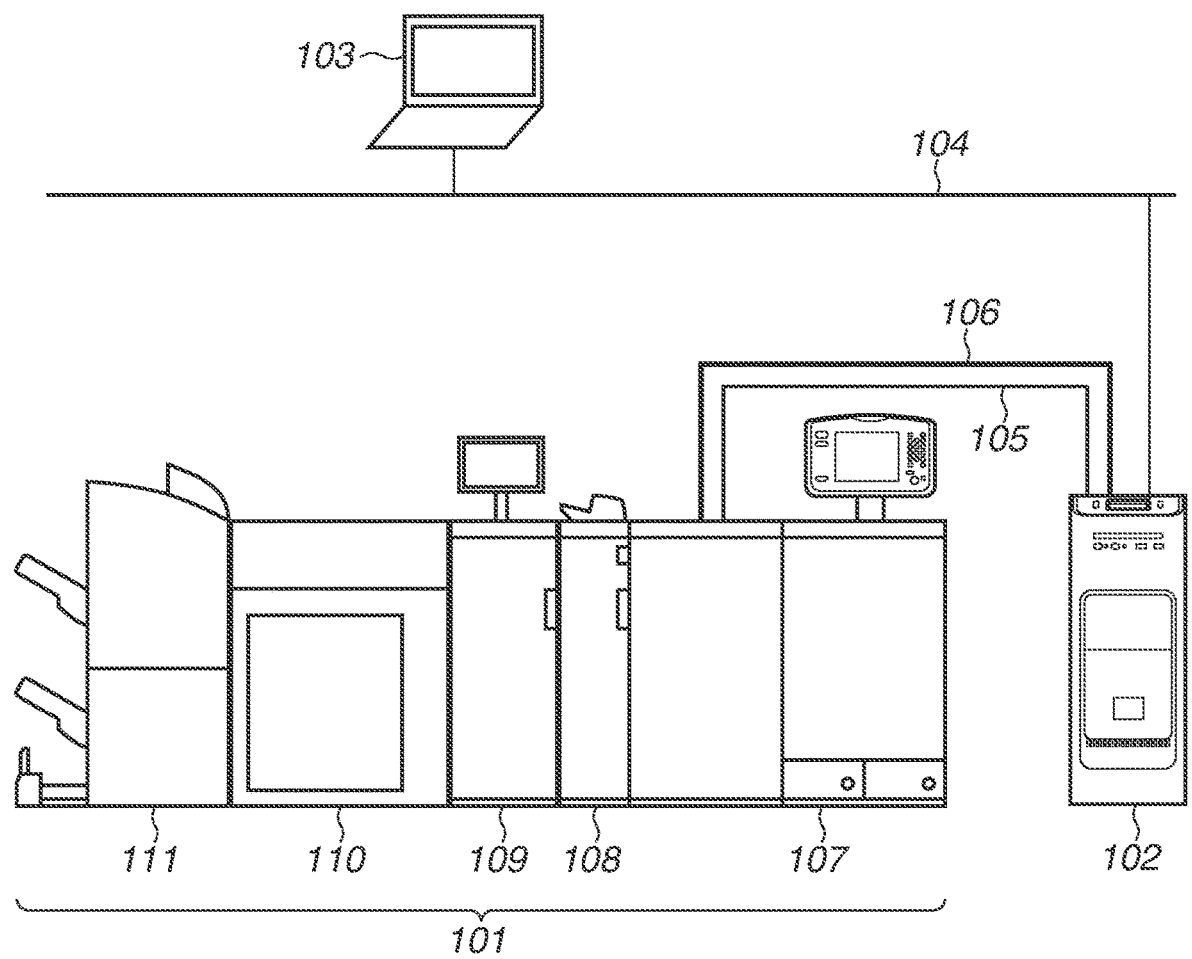
FIG. 1 is a diagram illustrating a system configuration of an image forming system.

Hereinafter, exemplary embodiments of the present disclosure will be described in detail with reference to the attached drawings. In this specification and drawings, the redundant description will be omitted by assigning the same reference numeral to each the component having substantially the same functional configuration.

<System Configuration>

An example of a system configuration of an image forming system according to a first exemplary embodiment will be described with reference to FIG. 1. The image forming system includes an image forming apparatus 101 and an external controller 102. The image forming apparatus 101 and the external controller 102 are communicably connected via an internal local area network (LAN) 105 and a video cable 106. The external controller 102 is communicably connected with a terminal apparatus 103 via an external LAN 104. Various instructions such as a print instruction are transmitted from the terminal apparatus 103 to the external controller 102.

The terminal apparatus 103 can be implemented by an information processing apparatus such as a personal computer (PC). A printer driver having a function of converting print data into printing description language processable by the external controller 102 is installed on the terminal apparatus 103. A user can thereby issue a print instruction via the above-described printer driver from various applications operating on the terminal apparatus 103. When the printer driver receives a print instruction from the user (or from an application that has received an instruction from the user), the printer driver transmits print data to the external controller 102 based on the print instruction. When the external controller 102 receives the print data from the terminal apparatus 103, the external controller 102 executes processing such as data analysis and rasterizing on the print data, transmits the processed image data to the image forming apparatus 101, and then issues a print instruction to the image forming apparatus 101.

When the image forming apparatus 101 receives the print instruction from the external controller 102, based on print data transmitted from the external controller 102, the image forming apparatus 101 prints an image corresponding to the print data, onto a recording medium (sheet) such as paper, and outputs a printed document in which the image is printed on the recording medium. In the present exemplary embodiment, paper is used as a recording medium.

Next, the image forming apparatus 101 will be described. The image forming apparatus 101 may have a configuration in which a plurality of apparatuses having different functions are connected to each other. With this configuration, the image forming apparatus 101 can execute complicated print processing such as bookbinding. For example, in the example illustrated in FIG. 1, the image forming apparatus 101 has a configuration in which a printing apparatus 107, an inserter 108, an inspection apparatus 109, a stacker 110, and a finisher 111 are connected.

The printing apparatus 107 forms an image using toner onto a sheet conveyed from a sheet feeding unit. The sheet feeding unit is provided in a lower part of the printing apparatus 107, for example. A configuration and an operation principle for the printing apparatus 107 forming an image using toner onto a sheet will be described.

The printing apparatus 107 modulates a light ray such as laser light emitted from a light source, in accordance with image data, and then emits the modulated light ray to a photosensitive drum as scanning light by reflecting the modulated light ray using a rotating polygon mirror such as a polygonal mirror. An electrostatic latent image is thereby formed on the photosensitive drum. The electrostatic latent image formed on the photosensitive drum by the light ray is developed using toner, and a toner image is transferred onto a sheet stuck to a transfer drum. Such a series of image forming processes are sequentially executed for each color toner used in image formation. In the present exemplary embodiment, yellow (Y) toner, magenta (M) toner, cyan (C) toner, and black (K) toner are used as color toners used in image formation, and a full-color image is thereby formed on a sheet based on the above-described image forming processes.

The printing apparatus 107 conveys the sheet on the transfer drum on which the image is formed, to a fixing device. The fixing device includes a roller and a belt, includes a built-in heat source such as a halogen heater within the roller, and fixes toner on the sheet including the transferred toner image, onto the sheet by melting the toner by heat and pressure.

The inserter 108 can insert another sheet to an arbitrary position among sheets of printed document conveyed after images are printed onto the sheets by the printing apparatus 107.

By reading an image printed on a conveyed sheet (e.g., printed document) and comparing the read image with a pre-registered reference image, the inspection apparatus 109 determines whether the image printed on the sheet is normal.

The stacker 110 is configured to be capable of stacking sheets such as sheets in the number corresponding to the capacity. In the image forming apparatus 101 according to the present exemplary embodiment, a stacker having relatively large capacity is used.

The finisher 111 performs finishing processing on sheets such as conveyed sheets. Examples of finishing processing include stapling, punching, and saddle stitch bookbinding. The finisher 111 discharges sheets having been subjected to finishing processing, to a discharge tray.

The system configuration illustrated in FIG. 1 is merely an example, and is not necessarily intended to limit the system configuration of the image forming system according to the present exemplary embodiment. As a specific example, the image forming system may have a configuration in which print data processable by the image forming apparatus 101 can be transmitted from the terminal apparatus 103 to the image forming apparatus 101 by connecting the image forming apparatus 101 to the external LAN 104. In this case, the image forming apparatus 101 may execute processing such as data analysis and rasterizing that is executed by the external controller 102.

The type of a network connecting the image forming apparatus 101, the external controller 102, and the terminal apparatus 103 is not specifically limited as long as various types of information and data (e.g., print instruction and print data) can be exchanged between these apparatuses. As a specific example, the above-described network is not limited to a LAN, and may be the Internet, a dedicated line, or a wide area network (WAN), for example. In addition, the above-described network may be a wired network or may be a wireless network. In addition, the above-described network may include a plurality of networks, and some networks may have types different from other networks. It is sufficient that communication between the above-described apparatuses is logically established, and a physical configuration of the above-described network is not specifically limited. As a specific example, communication between at least two or more apparatuses of the above-described apparatuses may be relayed by another communication apparatus.

<Hardware Configuration>

Figure 2:
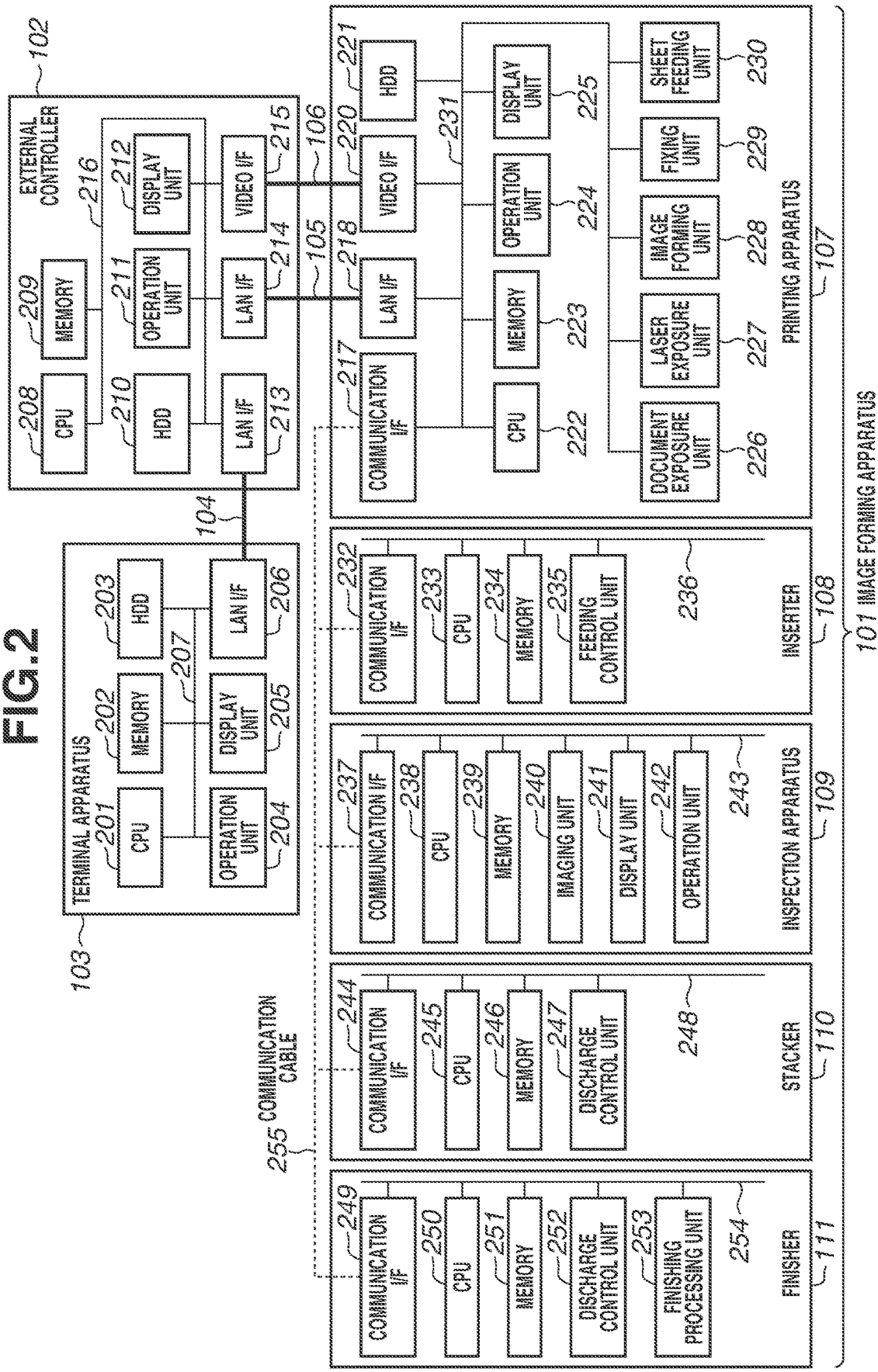
FIG. 2 is a block diagram illustrating hardware configurations of apparatuses included in an image forming system.

An example of hardware configurations of devices included in the image forming apparatus 101, the external controller 102, and the terminal apparatus 103 will be described with reference to FIG. 2. As illustrated in FIG. 1, the image forming apparatus 101 has a configuration in which the printing apparatus 107, the inserter 108, the inspection apparatus 109, the stacker 110, and the finisher 111 are connected.

A hardware configuration of the printing apparatus 107 will be described. The printing apparatus 107 includes a communication interface (I/F) 217, a LAN I/F 218, a video I/F 220, a hard disk drive (HDD) 221, a central processing unit (CPU) 222, a memory 223, an operation unit 224, and a display unit 225. The printing apparatus 107 further includes a document exposure unit 226, a laser exposure unit 227, an image forming unit 228, a fixing unit 229, and a sheet feeding unit 230. These components included in the printing apparatus 107 are connected via a system bus 231.

The communication I/F 217 is a communication interface for connecting the printing apparatus 107, through a communication cable 255, with other apparatuses configuring the image forming apparatus 101, such as the inserter 108, the inspection apparatus 109, the stacker 110, and the finisher 111. The printing apparatus 107 can thereby communicate with the other apparatuses configuring the image forming apparatus 101, for controlling these apparatuses.

The LAN I/F 218 is a communication interface for connecting the printing apparatus 107 to the external controller 102 via the internal LAN 105. The printing apparatus 107 can thereby communicate with the external controller 102 for transmitting print instructions and print data.

The video I/F 220 is a communication interface for connecting the printing apparatus 107 with the external controller 102 through the video cable 106. The printing apparatus 107 can thereby communicate with the external controller 102 for transmitting image data.

The HDD 221 is a storage device storing various programs and various types of data.

By loading a program stored in the HDD 221, onto the memory 223, and executing the program, the CPU 222 comprehensively performs image processing control and print control.

The memory 223 is used as a work area for loading corresponding programs when the CPU 222 executes various types of processing, and for temporarily storing image data.

The operation unit 224 receives the input of various settings and instructions of operations from the user.

By displaying various types of information, the display unit 225 presents the information to the user. The display unit 225 can be implemented by an output device such as a display. Information such as setting information of the image forming apparatus 101 and a processing status of a print job is displayed on the display unit 225.

The document exposure unit 226 executes processing related to document reading when a copy function or a scan function is used. As a specific example, the document exposure unit 226 reads document data by emitting light from an exposure lamp onto a sheet placed in a reading target region, and capturing an image of the sheet using an imaging unit such as a charge-coupled device (CCD) camera.

The laser exposure unit 227 is a device for performing primary charging of emitting laser light onto a photosensitive drum for transferring a toner image, and laser exposure. The laser exposure unit 227 initially performs primary charging for charging the surface of the photosensitive drum to a uniform negative potential. Subsequently, the laser exposure unit 227 emits laser light using a laser driver onto the photosensitive drum while adjusting a reflection angle using a polygonal mirror. This neutralizes negative charge of a portion irradiated with laser light, and an electrostatic latent image is formed on the photosensitive drum.

The image forming unit 228 is a device for transferring toner onto a sheet. The image forming unit 228 includes a development unit, a transfer unit, and a toner supply unit. The image forming unit 228 transfers toner on the photosensitive drum onto a sheet. The development unit visualizes the electrostatic latent image on the photosensitive drum surface by causing toner charged to negative potential, to adhere to the electrostatic latent image from a development cylinder. The transfer unit performs primary transfer of transferring toner on the photosensitive drum surface to a transfer belt by applying a positive potential to a primary transfer roller, and secondary transfer of transferring toner on the transfer belt to a sheet by applying a positive potential to a secondary transfer outer roller.

The fixing unit 229 is a device for melt-fixing toner on a sheet onto the sheet using heat and pressure, and includes a heater, a fixing belt, and a pressure belt.

The sheet feeding unit 230 is a device for feeding sheets, and controls a feeding operation and a conveyance operation of sheets using rollers and various sensors.

A hardware configuration of the inserter 108 will be described. The inserter 108 includes a communication I/F 232, a CPU 233, a memory 234, and a feeding control unit 235. These components included in the inserter 108 are connected with each other via a system bus 236.

The communication I/F 232 is a communication interface for connecting the inserter 108 with the printing apparatus 107 through the communication cable 255. The inserter 108 can thereby communicate with the printing apparatus 107 for controlling each device.

The CPU 233 performs various types of sheet feeding control in accordance with control programs stored in the memory 234.

The memory 234 is a storage device storing control programs.

The feeding control unit 235 controls rollers and sensors based on an instruction from the CPU 233, and controls a sheet feeding unit of the inserter 108, to control feeding and conveyance of sheets conveyed from the printing apparatus 107.

A hardware configuration of the inspection apparatus 109 will be described. The inspection apparatus 109 includes a communication I/F 237, a CPU 238, a memory 239, an imaging unit 240, a display unit 241, and an operation unit 242. These components included in the inspection apparatus 109 are connected with each other via a system bus 243.

The communication I/F 237 is a communication interface for connecting the inspection apparatus 109 with the printing apparatus 107 through the communication cable 255. The inspection apparatus 109 can thereby communicate with the printing apparatus 107 for controlling each device.

The CPU 238 performs various types of control related to an inspection of a printed document in accordance with control programs stored in the memory 239.

The memory 239 is a storage device storing control programs.

The imaging unit 240 captures an image of a conveyed sheet based on an instruction of the CPU 238.

By comparing an image captured by the imaging unit 240, and a reference image stored in the memory 239, and determining whether a printed image satisfies a predetermined condition, the CPU 238 determines whether the printed image is normal.

By displaying various types of information, the display unit 241 presents the information to the user. For example, an inspection result and a setting screen are displayed on the display unit 241.

The operation unit 242 receives the input of various settings and instructions of operations from the user. For example, the operation unit 242 receives an instruction to change the setting of the inspection apparatus 109, and an instruction to register a reference image.

A hardware configuration of the stacker 110 will be described. The stacker 110 includes a communication I/F 244, a CPU 245, a memory 246, and a discharge control unit 247. These component included in the stacker 110 are connected with each other via a system bus 248.

The communication I/F 244 is a communication interface for connecting the stacker 110 with the printing apparatus 107 through the communication cable 255. The stacker 110 can thereby communicate with the printing apparatus 107 for controlling each device.

The CPU 245 performs various types of sheet discharge control in accordance with control programs stored in the memory 246.

The memory 246 is a storage device storing control programs.

Based on an instruction from the CPU 245, the discharge control unit 247 performs control of conveying a conveyed sheet to a stack tray, an escape tray, or the subsequent finisher 111.

A hardware configuration of the finisher 111 will be described. The finisher 111 includes a communication I/F 249, a CPU 250, a memory 251, a discharge control unit 252, and a finishing processing unit 253. These components included in the finisher 111 are connected with each other via a system bus 254.

The communication I/F 249 is a communication interface for connecting the finisher 111 with the printing apparatus 107 through the communication cable 255. The finisher 111 can thereby communicate with the printing apparatus 107 for controlling each device.

The CPU 250 performs various types of finishing control and discharge control in accordance with control programs stored in the memory 251.

The memory 251 is a storage device storing control programs.

Based on an instruction from the CPU 250, the finishing processing unit 253 executes finishing processing such as stapling, punching, and saddle stitch bookbinding.

A hardware configuration of the external controller 102 will be described. The external controller 102 includes a CPU 208, a memory 209, an HDD 210, an operation unit 211, a display unit 212, a LAN I/F 213, a LAN I/F 214, and a video I/F 215. These component included in the external controller 102 are connected with each other via a system bus 216.

The HDD 210 is a storage device storing various programs and various types of data. For example, programs and data that are related to operations such as print processing are stored in the HDD 210.

Based on programs and data stored in the HDD 210, the CPU 208 comprehensively executes the reception of print data from the terminal apparatus 103, raster image processor (RIP) processing, and processing related to the transmission of print data to the image forming apparatus 101.

The memory 209 is used as a work area for loading corresponding programs when the CPU 208 executes various types of processing, and for temporarily storing data.

The operation unit 211 receives various instructions related to operations of the external controller 102 from the user. The operation unit 211 can be implemented by an input device such as a keyboard.

By displaying various types of information, the display unit 212 presents the information to the user. The display unit 212 can be implemented by an output device such as a display. For example, information regarding an application to be executed by the external controller 102 is displayed on the display unit 212 using video signals of still images or moving images.

The LAN I/F 213 is a communication interface for connecting the external controller 102 with the terminal apparatus 103 via the external LAN 104. The external controller 102 can thereby communicate with the terminal apparatus 103 for transmitting print instructions and print data.

The LAN I/F 214 is a communication interface for connecting the external controller 102 with the image forming apparatus 101 via the internal LAN 105. The external controller 102 can thereby communicate with the image forming apparatus 101 for transmitting print instructions.

The video I/F 215 is a communication interface for connecting the external controller 102 with the image forming apparatus 101 through the video cable 106. The external controller 102 can thereby communicate with the image forming apparatus 101 for transmitting print data.

A hardware configuration of the terminal apparatus 103 will be described. The terminal apparatus 103 includes a CPU 201, a memory 202, an HDD 203, an operation unit 204, a display unit 205, and a LAN I/F 206. These components included in the terminal apparatus 103 are connected with each other via a system bus 207.

The HDD 203 is a storage device storing various programs and various types of data. For example, programs and data that are related to operations such as print processing are stored in the HDD 203.

Based on programs and data stored in the HDD 203, the CPU 201 creates print data and issues a print instruction to another apparatus (e.g., the external controller 102, the image forming apparatus 101). In addition, the CPU 201 comprehensively controls operations of the components connected to the system bus 207.

The memory 202 is used as a work area for loading corresponding programs when the CPU 201 executes various types of processing, and for temporarily storing data.

The operation unit 204 receives various instructions related to operations of the terminal apparatus 103 from the user. The operation unit 204 can be implemented by an input device such as a keyboard.

By displaying various types of information, the display unit 205 presents the information to the user. The display unit 205 can be implemented by an output device such as a display. For example, information regarding an application to be executed by the terminal apparatus 103 is displayed on the display unit 205 using video signals of still images or moving images.

The above-described configuration is merely an example, and is not necessarily intended to limit hardware configurations of devices configuring the image forming apparatus 101, the external controller 102, and the terminal apparatus 103.

For example, the type of a network connecting the external controller 102 and the image forming apparatus 101 is not specifically limited as long as various types of information and various types of data used for printing can be exchanged between these apparatuses. As a specific example, only a video cable may be used for connecting the external controller 102 and the image forming apparatus 101. In this case, a print instruction from the external controller 102 to the image forming apparatus 101 is also transmitted through the video cable.

Each of the memories 202, 209, 223, 234, 239, 246, and 251 is only required to be a storage device that can store data and programs. As a specific example, these memories may be implemented by a volatile random access memory (RAM), a built-in HDD, an eternal HDD, and a universal serial bus (USB) memory. Among the above-described memories, a memory not involving recording and updating of information and data can also be implemented by a nonvolatile read only memory (ROM).

<Mechanical Configuration Related to Printing>

Figure 3:
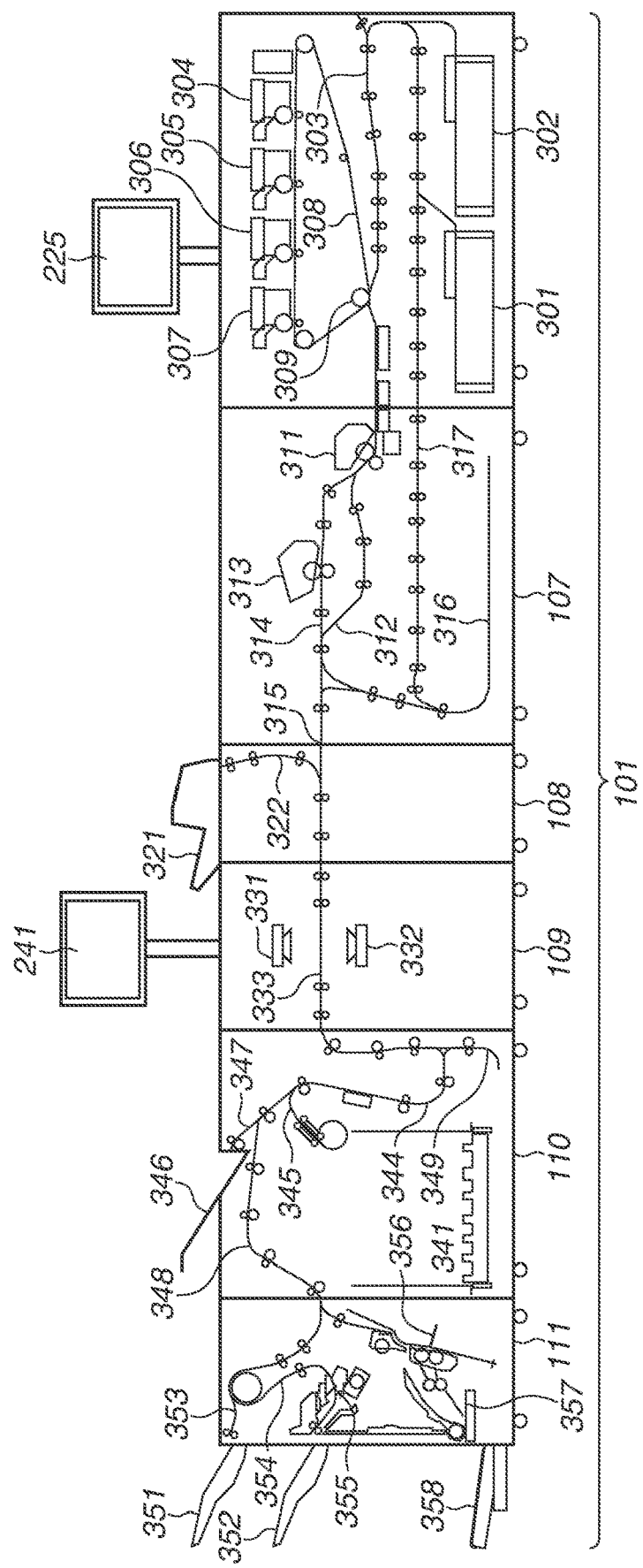
FIG. 3 is a mechanical cross-sectional diagram of an image forming apparatus.

A mechanical configuration of the image forming apparatus 101 will be described with reference to a mechanical cross-sectional diagram of the image forming apparatus 101 illustrated in FIG. 3, while focusing especially on a portion related to printing. FIG. 3 mainly illustrates components operating when various types of processing related to printing are executed, and the illustration of other components is omitted.

The printing apparatus 107 is an apparatus that forms an image by printing an image onto a sheet (i.e., an apparatus that performs printing). The printing apparatus 107 includes sheet feeding decks 301 and 302, a sheet conveyance path 303, development stations 304 to 307, an intermediate transfer belt 308, and a fixing unit 311. The printing apparatus 107 further includes sheet conveyance paths 312, 314, and 315, a second fixing unit 313, a sheet reversing path 316, and a two-sided conveyance path 317.

The sheet feeding decks 301 and 302 separate one uppermost sheet of stored sheets, and convey the sheet to the sheet conveyance path 303. For forming a color image, the development stations 304 to 307 form toner images using colored toner of Y, M, C, and K, respectively. The toner images formed by the development stations 304 to 307 are primarily transferred onto the intermediate transfer belt 308. The intermediate transfer belt 308 rotates in a clockwise direction in FIG. 3. Then, the toner images primarily transferred on the intermediate transfer belt 308 are secondarily transferred onto a sheet conveyed from the sheet conveyance path 303, at a secondary transfer position 309.

The display unit 225 displays a status of processing related to printing performed by the image forming apparatus 101, and various types of information regarding print settings.

The fixing unit 311 is a unit for fixing a toner image onto a sheet. The fixing unit 311 includes a pressure roller and a heating roller. The fixing unit 311 fixes a toner image onto a sheet by melting toner transferred on a sheet passing through between rollers, and applying pressure to the sheet. The sheet having passed through the fixing unit 311 is conveyed through the sheet conveyance path 312 to the sheet conveyance path 315 for outputting the sheet from the printing apparatus 107.

On the other hand, depending on the type of the sheet, further melting and pressure application are sometimes performed for fixing. In this case, the sheet having passed through the fixing unit 311 is conveyed to the second fixing unit 313 through another sheet conveyance path (conveyance path positioned above the sheet conveyance path 312 in FIG. 3) branched from the sheet conveyance path 312. Similar to the fixing unit 311, the second fixing unit 313 is a unit for fixing a toner image onto a sheet. The sheet having passed through the second fixing unit 313 is conveyed through the sheet conveyance path 314 to the sheet conveyance path 315 for outputting the sheet from the printing apparatus 107.

When the printing apparatus 107 is operating in an image formation mode of performing printing onto both surfaces of a sheet, a sheet conveyed through the sheet conveyance path 312 or 314 is conveyed to the sheet reversing path 316, and is reversed on the sheet reversing path 316. The sheet reversed in the sheet reversing path 316 is conveyed to the two-sided conveyance path 317, and image transfer onto the second surface (secondary transfer of a toner image) is performed at the secondary transfer position 309.

The inserter 108 inserts a desired sheet (hereinafter, also referred to as an "insertion sheet") to an arbitrary position of a series of fed sheets. The inserter 108 includes an inserter tray 321 and a sheet conveyance path 322.

An insertion sheet placed on the inserter tray 321 is conveyed through the sheet conveyance path 322 to join a conveyance path conveying fed sheets. With this configuration, by inserting an insertion sheet to an arbitrary position of a series of sheets conveyed from the printing apparatus 107, the series of sheets including the inserted insertion sheet can be conveyed to a subsequent apparatus.

The sheet having passed through the inserter 108 is conveyed to the inspection apparatus 109. The inspection apparatus 109 includes cameras 331 and 332 and a sheet conveyance path 333. The cameras 331 and 332 are supported in a state of facing each other across the sheet conveyance path 333, and are imaging apparatuses for reading mutually-different surfaces of a sheet conveyed through the sheet conveyance path 333. In the present exemplary embodiment, the camera 331 is an imaging apparatus for reading the top surface of a sheet, and the camera 332 is an imaging apparatus for reading the bottom surface of the sheet.

At a timing at which the sheet conveyed to the sheet conveyance path 333 reaches a predetermined position, the inspection apparatus 109 reads images printed on both surfaces of the sheet using the cameras 331 and 332. The inspection apparatus 109 can thereby determine whether a read image is normal (i.e., whether printing is properly performed), by comparing the image read from each surface of the sheet, with a pre-registered reference image.

Various types of information (e.g., information corresponding to an inspection result) regarding an inspection performed by the inspection apparatus 109 are displayed on the display unit 241.

The stacker 110 is configured to be capable of stacking sheets in the number corresponding to the capacity. In the image forming apparatus 101 according to the present exemplary embodiment, a stacker having relatively large capacity is used as the stacker 110. The stacker 110 includes a stack tray 341, sheet conveyance paths 344, 345, 347, and 348, an escape tray 346, and a reversing unit 349.

The sheet having passed through the inspection apparatus 109 is input to the stacker 110 through the sheet conveyance path 344, and is stacked on the stack tray 341 through the sheet conveyance path 345.

The escape tray 346 is a discharge tray used for discharging sheets determined by the inspection apparatus 109 to be defective sheets. When a sheet is to be conveyed to the escape tray 346, a targeted sheet (e.g., sheet determined to be a defective sheet) is conveyed to the escape tray 346 through the sheet conveyance paths 344 and 347.

When a sheet is to be conveyed to the finisher 111 positioned posterior to the stacker 110, a targeted sheet is conveyed to the subsequent processing apparatus (finisher 111) through the sheet conveyance path 348.

The reversing unit 349 is a unit for reversing a sheet, and is used when a targeted sheet is stacked on the stack tray 341. When a targeted sheet is to be stacked on the stack tray 341, the sheet is stacked on the stack tray 341 after the sheet is reversed by the reversing unit 349 in such a manner that the orientation of an input sheet and the orientation of an output sheet match with each other. When the sheet is to be conveyed to the escape tray 346 or the subsequent finisher 111, because the sheet is discharged as-is without being flipped at the time of stacking, a reversing operation is not performed by the reversing unit 349.

The finisher 111 performs finishing processing on a conveyed sheet based on a function designated by the user. As a specific example, the finisher 111 has a finishing function such as stapling (stapling at one point or two points), punching (two holes or three holes), and saddle stitch bookbinding. The finisher 111 includes discharge trays 351 and 352, sheet conveyance paths 353, 354, and 357, a processing unit 355, and a saddle stitch bookbinding tray 358.

When finishing processing such as stapling is not to be performed on a sheet fed to the finisher 111, the targeted sheet is output to the discharge tray 351 through the sheet conveyance path 353.

On the other hand, when finishing processing such as stapling is to be performed on a sheet fed to the finisher 111, the targeted sheet is conveyed to the processing unit 355 through the sheet conveyance path 354. The processing unit 355 performs finishing processing corresponding to a finishing function designated by the user, on the conveyed sheet. Then, the sheet on which finishing processing is performed by the processing unit 355 is output to the discharge tray 352.

Each of the discharge trays 351 and 352 is supported so as to be movable upward and downward. Thus, by moving the discharge tray 351 downward, for example, a sheet on which finishing processing is performed by the processing unit 355 can also be stacked on the discharge tray 351.

When saddle stitch bookbinding is designated, bookbinding is performed by performing, for example, stapling processing at the sheet center by the saddle stitch processing unit 356, and then double folding the sheet. The bound sheet (hereinafter, also referred to as "saddle stitch bound bundle") is output to the saddle stitch bookbinding tray 358 through the sheet conveyance path 357. The saddle stitch bookbinding tray 358 has a belt conveyor configuration, for example, and a saddle stitch bound bundle stacked on the saddle stitch bookbinding tray 358 is conveyed toward the left direction in FIG. 3.

<Display Screen>

An example of a display screen to be presented to the user for the inspection apparatus 109 receiving, from the user, an instruction to inspect a printed document will be described with reference to FIGS. 4 to 13. Display screens illustrated in FIGS. 4 to 13 are displayed on a predetermined output destination based on an instruction of the CPU 238 of the inspection apparatus 109. In the following description, for the sake of convenience, the display screens illustrated in FIGS. 4 to 13 are assumed to be displayed on the display unit 241 of the inspection apparatus 109.

By comparing an image read from a conveyed sheet (hereinafter, also referred to as a "sheet image"), with a preset reference image in accordance with preset inspection items, the inspection apparatus 109 inspects the sheet image. Examples of methods of comparing images include a method of comparing pixel values for each image position, a method of comparing positions of objects that is based on edge detection, and a method of comparing character data extracted by optical character recognition (OCR). Examples of inspection items include a shift in printing position, coloring of images, density of image, streaks, faint print, and printing deficiency.

Figure 4:
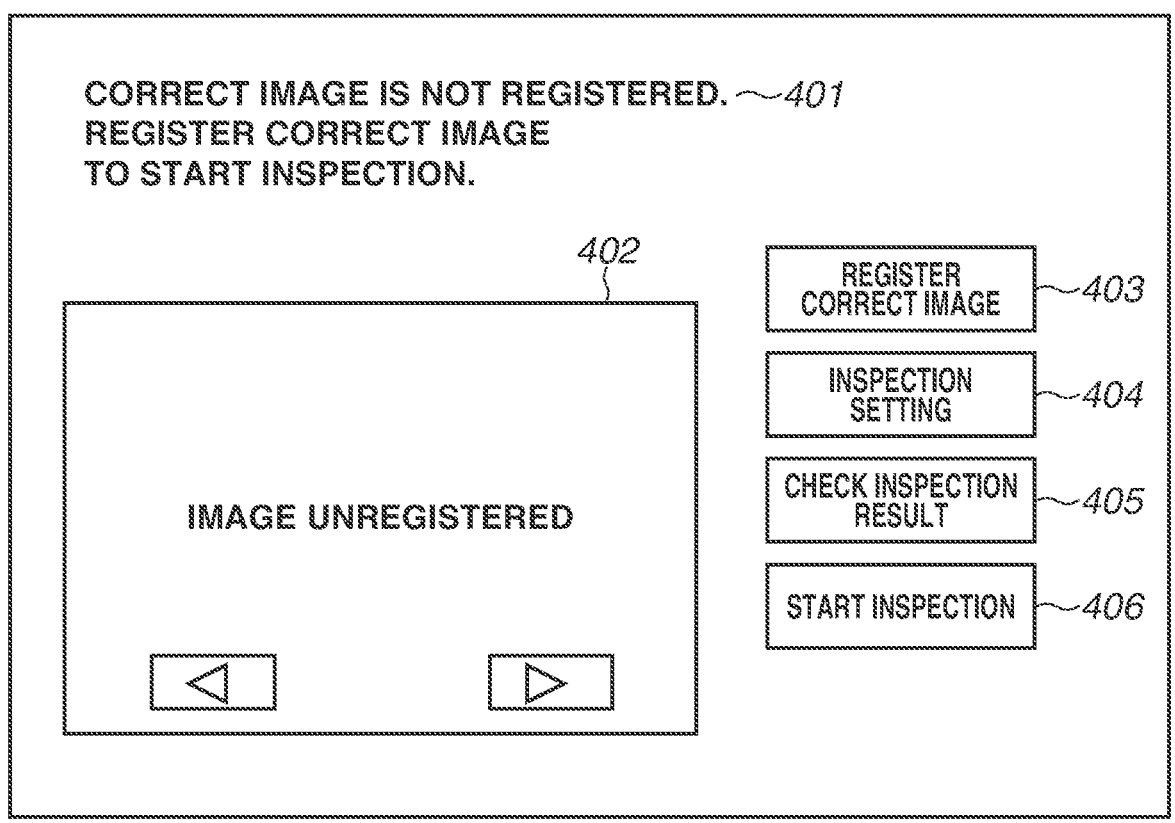
FIG. 4 illustrates an example of a screen to be displayed when an inspection apparatus is activated.

FIG. 4 illustrates an example of a screen to be displayed on the display unit 241 when the inspection apparatus 109 is activated.

Because a reference image is not registered, a message for prompting the user to register a reference image for starting an inspection of a printed document is displayed in a display region 401.

If a reference image is registered, the reference image is displayed in a display region 402. In the example illustrated in FIG. 4, because a reference image is unregistered, information indicating that a reference image is unregistered is displayed. An example of a screen to be displayed when a reference image is registered will be separately described below.

A button 403 is a button for receiving, from the user, an instruction to invoke a registration screen of a reference image. The reference image is an image to be compared by the inspection apparatus 109 with an image read from a conveyed sheet (printed document). For example, an image read by the inspection apparatus 109 from a normally-printed sheet visually confirmed in advance is used.

A button 404 is a button for receiving, from the user, an instruction to invoke a setting screen related to an inspection of a printed document. The setting screen related to an inspection of a printed document is a screen for receiving the designation of setting information regarding inspection items and inspection accuracy (e.g., a degree of a difference from a reference image that is to be determined to be a defective image). Via the setting screen, the user can designate inspection items and inspection accuracy that are suitable for an inspection purpose.

A button 405 is a button for receiving, from the user, an instruction to invoke a confirmation screen of an inspection result. Via the confirmation screen, the user can check the details of inspections performed in the past, and inspection results.

A button 406 is a button for receiving, from the user, an instruction to start an inspection. If the inspection apparatus 109 receives an instruction to start an inspection, via the button 406, the inspection apparatus 109 starts reading an image (sheet image) from a conveyed sheet, and inspecting the read sheet image (read image). At this time, the inspection apparatus 109 notifies the printing apparatus 107 that an operation mode has transitioned to an operation mode related to an inspection of a printed document (hereinafter, also referred to as an "inspection mode"), and an operation related to an inspection of a printed document has started.

Figure 5A:
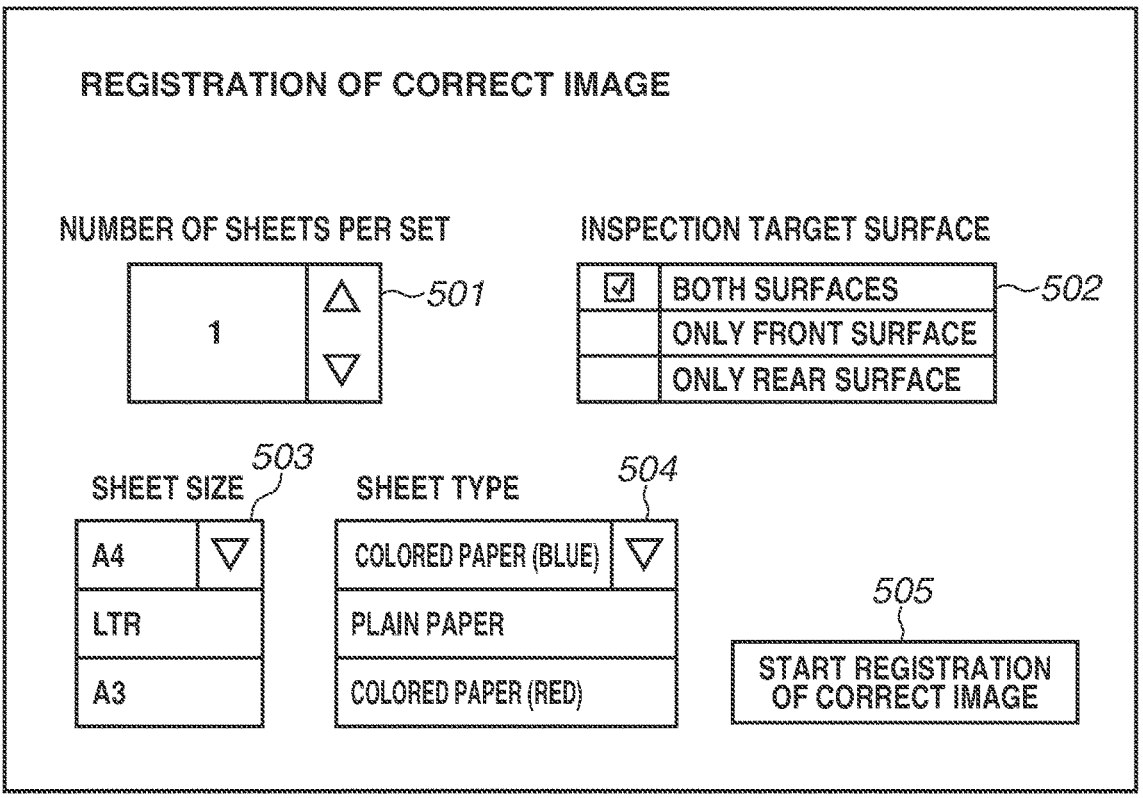
FIGS. 5A and 5B each illustrate an example of a registration screen of a reference image.
Figure 5B:
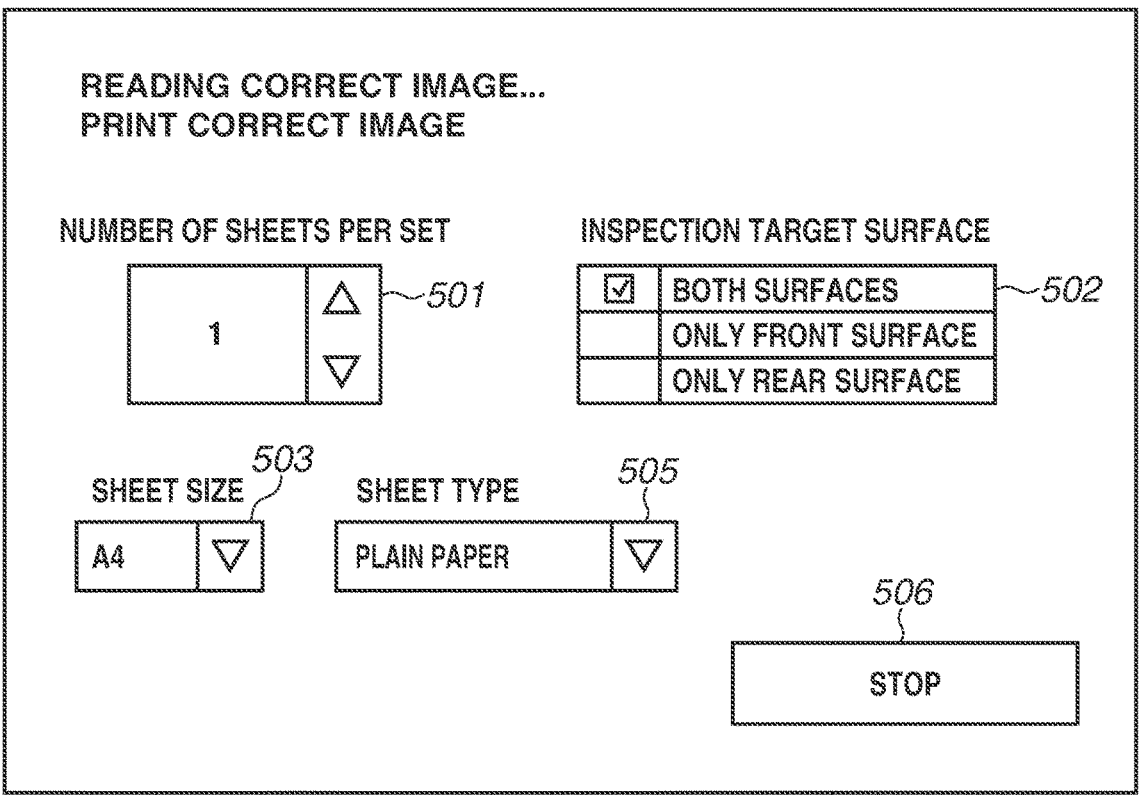

FIGS. 5A and 5B each illustrate an example of a registration screen of a reference image. Specifically, FIG. 5A illustrates an example of a screen for receiving, from the user, the designation of setting information regarding registration of a reference image. FIG. 5B illustrates an example of a screen to be displayed while a reference image is being read.

First, FIG. 5A will be described. By pressing the button 403 illustrated in FIG. 4, a display screen illustrated in FIG. 5A is displayed on the display unit 241 of the inspection apparatus 109.

A setting region 501 is a setting region for receiving, from the user, the designation of setting information regarding the number of sheets per set of a print job to be inspected. When a print job including two or more sheets per set is to be inspected, by designating setting information regarding the number of sheets per set in the setting region 501, it becomes possible to register a plurality of images in the inspection apparatus 109 as reference images.

A setting region 502 is a setting region for receiving, from the user, the designation of setting information regarding an inspection target surface of a sheet. More specifically, in the setting region 502, the designation of an inspection target surface of a conveyed sheet from among "both surfaces", "only front surface", and "only rear surface" can be received. The setting information regarding an inspection target surface of a sheet needs not necessarily coincide with setting information regarding a surface of a sheet on which printing is performed. As a specific example, by setting both surfaces as inspection target surfaces when printing is performed only on one surface, whether dirt is attached to a surface on which printing is not performed can also be inspected.

A setting region 503 is a setting region for receiving, from the user, the designation of a size of a sheet serving as a reference image. For example, in the example illustrated in FIG. 5A, the setting region 503 is implemented as a pull-down menu. A list of designatable sheet sizes is displayed as a menu, and a sheet size corresponding to a selected item is set as a sheet size of a reference image. In the example illustrated in FIG. 5A, "A4", "LTR", and "A3" are presented as selectable sheet sizes, and "A4" is selected as a sheet size of a reference image.

A setting region 504 is a setting region for receiving, from the user, the designation of a sheet type of a sheet to be used in an inspection. For example, in the example illustrated in FIG. 5A, the setting region 504 is implemented as a pull-down menu. A list of designatable sheet types is a displayed as a menu, and a sheet type corresponding to a selected item is set as a sheet type of a sheet to be used in an inspection. In the example illustrated in FIG. 5A, "colored paper (blue)", "plain paper", and "colored paper (red)" are presented as selectable sheet types, and "colored paper (blue)" is selected as a sheet type of a sheet to be used in an inspection.

A button 505 is a button for receiving, from the user, an instruction to start the registration of a reference image. If the inspection apparatus 109 detects that the button 505 is pressed, the inspection apparatus 109 reads a reference image switching sheet conveyed afterward and a sheet image, and registers the read image as a reference image. A barcode to be used for uniquely identifying a reference image is printed on the reference image switching sheet. The inspection apparatus 109 associates the read barcode image with the above-described reference image, and then stores the reference image.

Next, FIG. 5B will be described. If the button 505 illustrated in FIG. 5A is pressed, a display screen illustrated in FIG. 5B is a displayed on the display unit 241 of the inspection apparatus 109. The display screen illustrated in FIG. 5B is displayed from a reading start of a barcode-printed sheet until reading of sheets in the number of sheets designated via the setting region 501 is completed.

A button 506 is a button for receiving, from the user, an instruction to stop reading a reference image. If the inspection apparatus 109 detects that the button 506 is pressed, the inspection apparatus 109 stops processing related to reading of a reference image. In this case, registration of a reference image is not performed, and the display screen illustrated in FIG. 5A is redisplayed on the display unit 241 of the inspection apparatus 109.

FIGS. 6A and 6B each illustrate an example of a screen to be displayed on the display unit 241 of the inspection apparatus 109 in accordance with a reading result of a reference image after the reading of the reference image is completed. Specifically, FIG. 6A illustrates an example of a screen for receiving, from the user, designation related to the registration of a reference image. FIG. 6B illustrates an example of a screen for receiving, from the user, an instruction related to the setting of an inspection skip area in a reference image. The details of the inspection skip area will be separately described below.

First, FIG. 6A will be described. If reading of a reference image is performed by pressing the button 505 illustrated in FIG. 5A, after the completion of reading the reference image, a display screen illustrated in FIG. 6A is displayed on the display unit 241 of the inspection apparatus 109.

A display region 601 is a region in which an image of a sheet read by the inspection apparatus 109 is displayed.

A switching button 602 is a button for receiving, from the user, an instruction to switch a sheet image to be displayed in the display region 601, when the inspection apparatus 109 has read a plurality of sheet images.

A switching button 603 is a button for receiving, from the user, an instruction to switch an image of a surface (front surface or rear surface) to be displayed in the display region 601, when the inspection apparatus 109 has read images on both surfaces of a sheet (i.e., when both of the front and rear surfaces are to be inspected).

A button 604 is a button for receiving, from the user, an instruction to set an inspection skip area. Like variable data printing (VDP), printing is sometimes performed while changing printing content of a specific area for each set. More specifically, an example of a case where printing is performed while changing printing content of a specific area for each set corresponds to a case where an identification (ID) different for each set is printed, or a case where printing content of information such as an address and a name is changed for each set. In such a case, by setting an inspection skip area in the above-described specific area, it is possible to cause the inspection apparatus 109 to exclude the specific area from an inspection target.

A button 605 is a button for receiving, from the user, an instruction to register an image displayed in the display region 601, as a reference image. If the inspection apparatus 109 detects that the button 605 is pressed, the inspection apparatus 109 registers an image displayed in the display region 601, as a reference image. If the registration of the reference image is completed, the inspection apparatus 109 redisplays the display screen illustrated in FIG. 4, on the display unit 241.

A button 606 is a button for receiving, from the user, an instruction to cancel reading of a reference image. If the inspection apparatus 109 detects that the button 606 is pressed, the inspection apparatus 109 redisplays the display screen illustrated in FIG. 4, on the display unit 241 without registering a reference image.

Next, FIG. 6B will be described. If the button 604 illustrated in FIG. 6A is pressed, a display screen illustrated in FIG. 6B is displayed on the display unit 241 of the inspection apparatus 109.

A region 611 is a region indicating an inspection skip area.

A setting region 612 is a setting region for receiving, from the user, an instruction to change a position on a reference image at which the region 611 is to be set.

A setting region 613 is a setting region for receiving, from the user, an instruction to change a size of the region 611.

A button 614 is a button for receiving, from the user, an instruction to register an inspection skip area. If the inspection apparatus 109 detects that the button 614 is pressed, the inspection apparatus 109 registers the region 611 set on the reference image displayed in the display region 601, as an inspection skip area. If the registration of an inspection skip area is completed, the inspection apparatus 109 redisplays the display screen illustrated in FIG. 6A, on the display unit 241.

A button 615 is a button for receiving, from the user, an instruction to further register another inspection skip area in addition to a registered inspection skip area. If the inspection apparatus 109 detects that the button 615 is pressed, the inspection apparatus 109 receives an instruction to newly register another inspection skip area, while holding information regarding the registered inspection skip area. In this way, it becomes possible to register a plurality of inspection skip areas.

A button 616 is a button for receiving, from the user, an instruction to cancel the setting of an inspection skip area. If the inspection apparatus 109 detects that the button 616 is pressed, the inspection apparatus 109 redisplays the display screen illustrated in FIG. 6A, on the display unit 241 without registering an inspection skip area.

Figure 7:
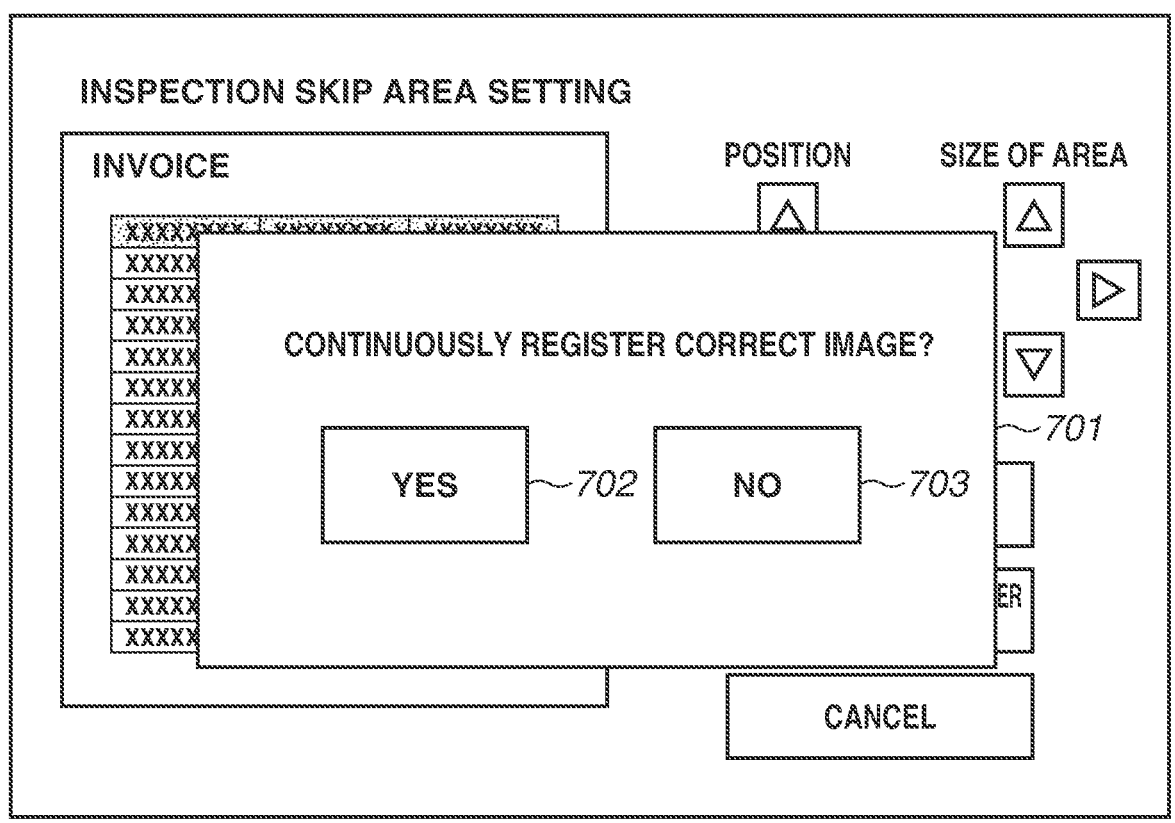
FIG. 7 illustrates a dialog box for receiving an instruction to register a reference image.

FIG. 7 illustrates an example of a dialog box to be displayed for receiving, from the user, an instruction as to whether to continuously register another reference image, after a reference image is registered. A dialog box 701 illustrated in FIG. 7 is displayed when the button 605 illustrated in FIG. 6A or the button 614 illustrated in FIG. 6B is pressed.

Buttons 702 and 703 are buttons for receiving, from the user, an instruction as to whether to continuously register another reference image. If the button 702 is pressed, the display screen illustrated in FIG. 5A is redisplayed. In this way, it becomes possible to additionally register another reference image different from a previously-registered reference image. On the other hand, if the button 703 is pressed, the reception of an instruction to register a reference image from the user is ended. In this case, the main setting screen illustrated in FIG. 4 is redisplayed.

Figure 8:
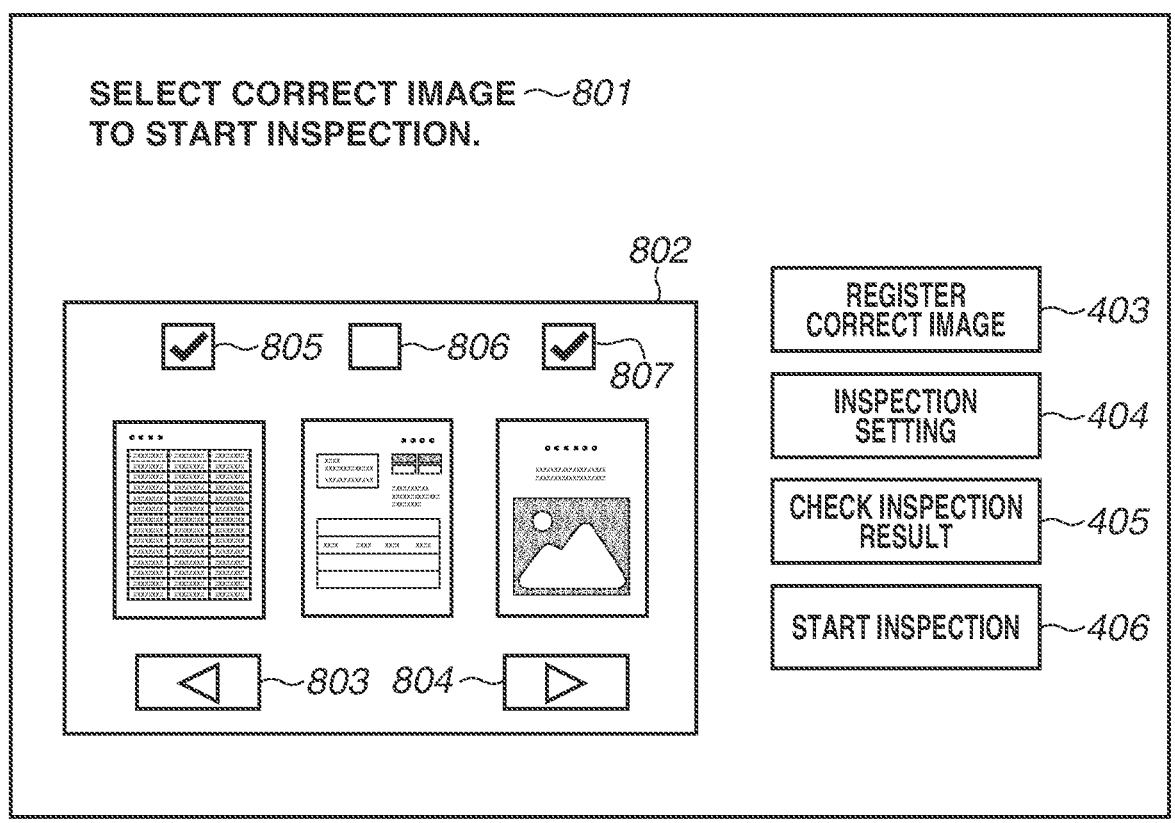
FIG. 8 is a diagram illustrating one state of a main setting screen.

FIG. 8 illustrates an example of one state of a main setting screen illustrated in FIG. 4 when a plurality of reference images is registered.

Because a plurality of reference images is registered, a message for prompting the selection of a reference image to be used in an inspection is displayed in a display region 801.

A plurality of registered reference images is displayed in a display region 802 in a distinguishable manner. As a specific example, in the example illustrated in FIG. 8, the respective thumbnail images of the plurality of registered reference images are displayed in the display region 802. In some cases, it is difficult to display all the registered reference images in the display region 802. Thus, scroll buttons 803 and 804 may be provided. If either one of the scroll buttons 803 and 804 receives an instruction, a list of reference images displayed in the display region 802 is scrolled in a direction corresponding to the button that has received the instruction. In this way, it becomes possible to display another reference image positioned on the outside of the display region 802, in the display region 802.

Checkboxes 805 to 807 are checkboxes for receiving, from the user, an instruction to select a reference image to be used in an inspection, from among a series of reference images displayed in the display region 802. The checkboxes 805 to 807 are respectively associated with mutually-different reference images. If an instruction is received, an associated reference image is set as a reference image to be used in an inspection, and a checkmark indicating a selected state is displayed. For example, in the example illustrated in FIG. 8, the checkboxes 805 and 807 receive instructions, and reference images associated with these checkboxes are set as reference images to be used in an inspection.

If the button 406 receives an instruction in a state where a reference image to be used in an inspection is selected, processing related to an inspection of a printed document that uses the reference image is started.

Figure 9:
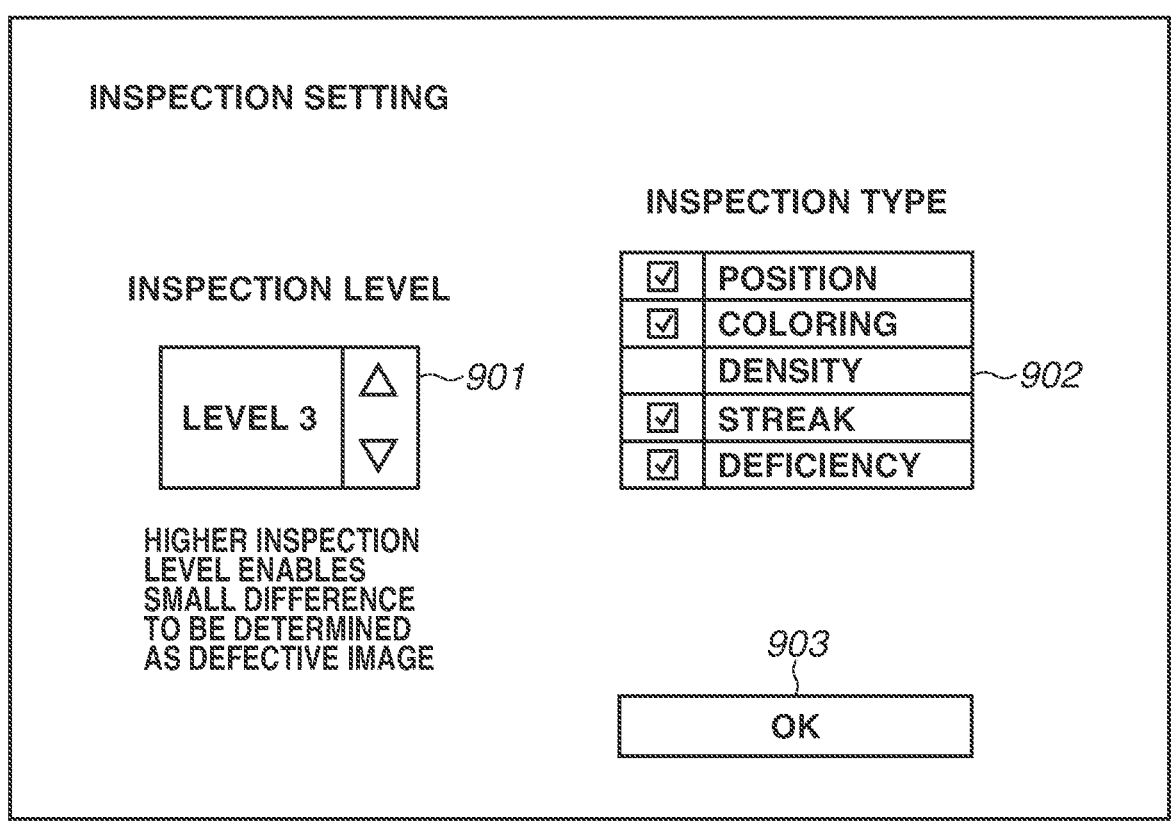
FIG. 9 illustrates an example of a setting screen related to an inspection of a printed document.

FIG. 9 illustrates an example of a setting screen related to an inspection of a printed document. By pressing the button 404 illustrated in FIG. 4, a display screen illustrated in FIG. 9 is displayed on the display unit 241 of the inspection apparatus 109.

A setting region 901 is a setting region for receiving, from the user, the designation of an inspection level related to an inspection of a printed document. An inspection level indicates an index of a degree of accuracy related to an inspection of a printed document. As the inspection level becomes higher, accuracy related to an inspection of a printed document becomes higher. In addition, as accuracy related to an inspection of a printed document becomes higher, a condition for the inspection apparatus 109 determining a read image to be a normal image becomes stricter. More specifically, as accuracy related to an inspection of a printed document becomes higher, the inspection apparatus 109 determines a read image to be a defective image based on a detection result of a smaller difference between a reference image and the read image.

A setting region 902 is a setting region for receiving, from the user, the designation of an inspection type related to an inspection of a printed document. The setting region 902 presents a list of inspection items designatable as an inspection target of a printed document, and receives the designation of at least partial inspection item of the list. For example, in the example illustrated in FIG. 9, the setting region 902 presents "position", "coloring", "density", "streak", and "deficiency" as a list of designatable inspection items. In addition, in the example illustrated in FIG. 9, among the list of inspection items presented in the setting region 902, "position", "coloring", "streak", and "deficiency" are designated as inspection target items. In this case, among the list of inspection items, the inspection apparatus 109 sets "position", "coloring", "streak", and "deficiency" as inspection target items of a printed document, and excludes "density" from inspection target items of a printed document.

A button 903 is a button for receiving, from the user, an instruction to reflect setting information designated in the setting regions 901 and 902. If the inspection apparatus 109 detects that the button 903 is pressed, the inspection apparatus 109 reflects the setting information designated in the setting regions 901 and 902. If the reflection of setting information regarding an inspection of a printed document is completed, the inspection apparatus 109 redisplays the display screen illustrated in FIG. 4, on the display unit 241.

FIG. 10 illustrates an example of a confirmation screen of an inspection result. By pressing the button 406 illustrated in FIG. 4, a display screen illustrated in FIG. 10 is displayed on the display unit 241 of the inspection apparatus 109.

A display region 1001 is a region in which an attribute of the inspected entire job and information corresponding to an inspection result are displayed.

A setting region 1003 is a setting region for receiving, from the user, an instruction to switch a job of which an inspection result is to be displayed. In the example illustrated in FIG. 10, among three jobs of which histories of inspection results are stored, a first job is designated in the setting region 1003. Thus, information corresponding to an inspection result of the first job is displayed in the display region 1001. In the setting region 1003, a "previous job" button and a "next job" button are displayed. The "previous job" button is a button for receiving, from the user, an instruction for newly setting an immediately preceding job of a display target job of an inspection result as a display target job of an inspection result. The "next job" button is a button for receiving, from the user, an instruction for newly setting an immediately succeeding job of a display target job of an inspection result as a display target job of an inspection result.

A button 1004 is a button for receiving, from the user, an instruction to complete the checking of an inspection result. If the inspection apparatus 109 detects that the button 1004 is pressed, the inspection apparatus 109 redisplays the display screen illustrated in FIG. 4, on the display unit 241.

Figure 11A:
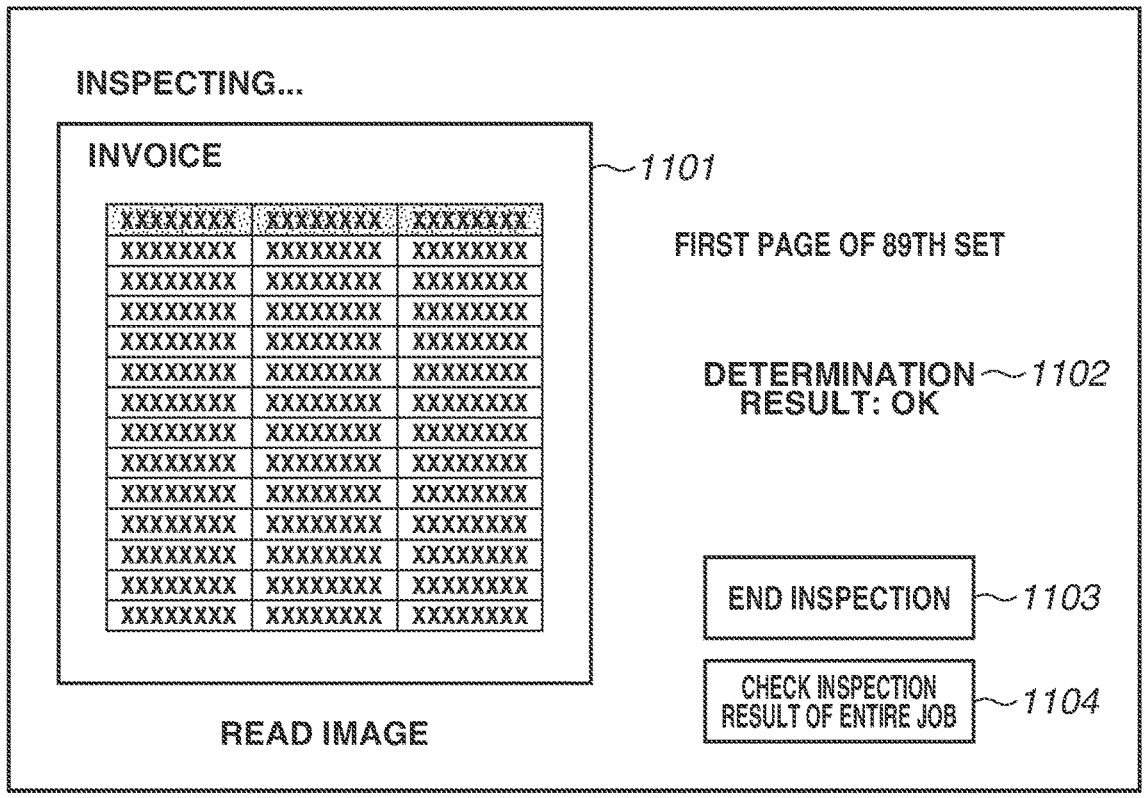
FIGS. 11A and 11B each illustrate an example of a display screen to be displayed after an inspection of a printed document is started.
Figure 11B:
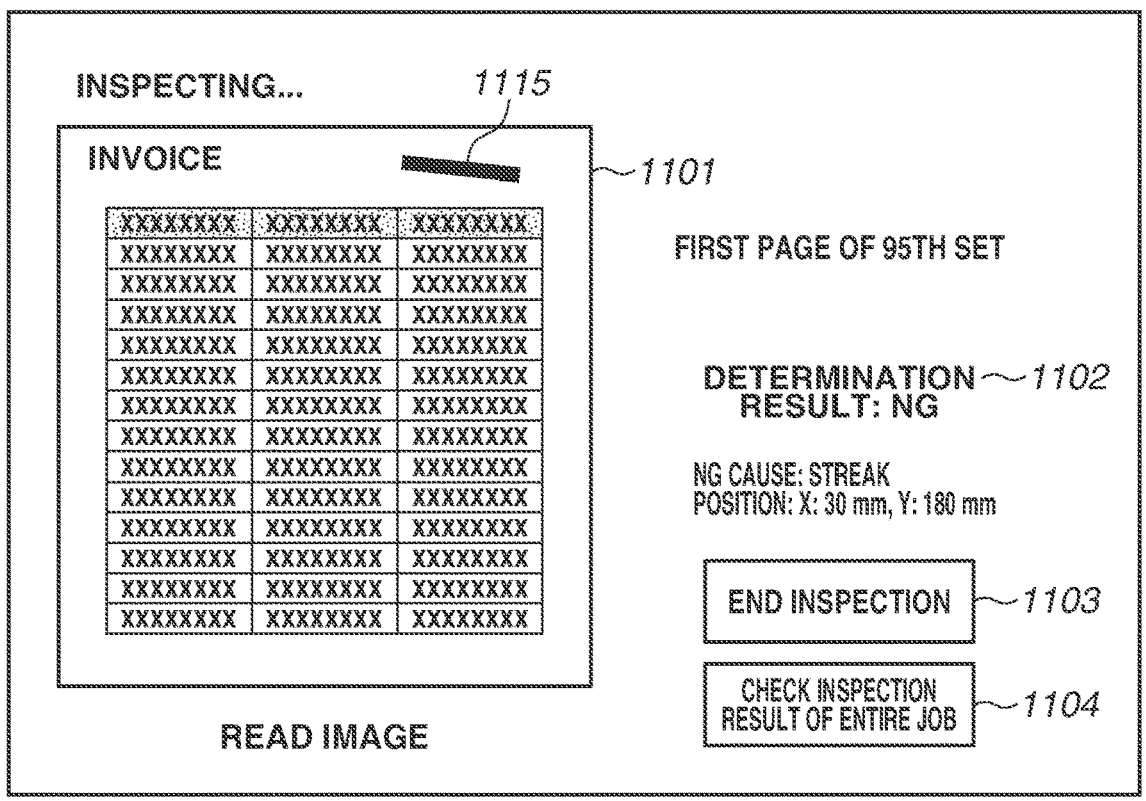

FIGS. 11A and 11B each illustrate an example of a display screen to be displayed after an inspection of a printed document is started. Specifically, FIG. 11A illustrates an example of a screen to be displayed when an image read from an inspection target printed document is determined to be a normal image. FIG. 11B illustrates an example of a screen to be displayed when an image read from an inspection target printed document is determined to be a defective image. The display screens respectively illustrated in FIGS. 11A and 11B are displayed on the display unit 241 of the inspection apparatus 109 in accordance with an inspection result of an image read from a conveyed sheet, after the button 406 illustrated in FIG. 4 is pressed and an inspection is started.

First, FIG. 11A will be described.

In a display region 1101, an image read by the inspection apparatus 109 from a conveyed sheet is presented. If sheets are sequentially conveyed to the inspection apparatus 109, the latest image (i.e., an image lastly read by the inspection apparatus 109) among images read by the inspection apparatus 109 from the sheets is displayed in the display region 1101.

A display region 1102 is a display region in which information corresponding to a comparison result between a read image displayed in the display region 1101, and a reference image (i.e., information corresponding to an inspection result of a conveyed sheet) is displayed. In the example illustrated in FIG. 11A, because the read image is determined to be a normal image, "determination result: OK" is displayed in the display region 1102 as information indicating a result of the determination.

A button 1103 is a button for receiving, from the user, an instruction to end an inspection of a printed document. If the inspection apparatus 109 detects that the button 1103 is pressed, the inspection apparatus 109 ends processing related to an inspection of a printed document, and redisplays the display screen illustrated in FIG. 4, on the display unit 241.

A button 1104 is a button for receiving, from the user, an instruction to display a confirmation screen of an inspection result of the entire job. If the inspection apparatus 109 detects that the button 1104 is pressed, the inspection apparatus 109 displays the display screen illustrated in FIG. 10, on the display unit 241. At this time, the inspection apparatus 109 notifies the printing apparatus 107 that an operation in the inspection mode has ended in accordance with the end of the inspection.

Next, FIG. 11B will be described.

In the example illustrated in FIG. 11B, because a streak 1115 is detected in a read image displayed in the display region 1101, the read image is determined to be a defective image. Thus, "determination result: NG" is displayed in the display region 1102 as information indicating a result of the determination. Together with the determination result, the detection of the streak 1115 is displayed as a cause for NG determination, and a position at which the streak 1115 is detected is displayed.

FIG. 12 illustrates an example of a selection screen of an inspection job. A display screen illustrated in FIG. 12 is displayed on the display unit 212 of the external controller 102.

A setting region 1201 is a setting region in which a list of inspection jobs received from the terminal apparatus 103 is displayed, and is a setting region for receiving, from the user, the selection of a print job targeted in print processing. In the example illustrated in FIG. 12, inspection jobs respectively corresponding to "invoice", "quotation", "booklet", and "written approval" are received, and among these inspection jobs, inspection jobs respectively corresponding to "invoice", "quotation", and "booklet" are selected.

A button 1202 is a button for receiving, from the user, an instruction for determining inspection jobs selected in the setting region 1201, as an execution target, and causing the screen to transition to a setting screen of an inspection job to be described below with reference to FIG. 13. If the external controller 102 detects that the button 1202 is pressed in a state where inspection jobs displayed in the setting region 1201 are selected, the external controller 102 displays the setting screen of an inspection job that is illustrated in FIG. 13, on the display unit 212.

A button 1203 is a button for receiving, from the user, an instruction to cancel an inspection of a printed document. If the external controller 102 detects that the button 1203 is pressed, the external controller 102 stops transmitting a print instruction to the image forming apparatus 101 based on a print job received from the terminal apparatus 103.

FIG. 13 illustrates an example of a setting screen of an inspection job. The display screen illustrated in FIG. 13 is displayed on the display unit 212 of the external controller 102. FIG. 13 illustrates an example of a case where the button 1202 is pressed in the example illustrated in FIG. 12.

A setting region 1301 is a setting region for receiving, from the user, instructions related to various settings for print jobs selected in the setting region 1201 of the display screen illustrated in FIG. 12. In the example illustrated in FIG. 13, inspection jobs respectively corresponding to "invoice", "quotation", and "booklet" are displayed as inspection jobs for which instructions related to various settings are to be received.

A setting region 1302 is a setting region for receiving, from the user, an instruction related to the number of sets of a printed document to be printed based on a targeted inspection job. In the example illustrated in FIG. 13, for the inspection jobs corresponding to invoice", "quotation", and "booklet", "300" sets, "100" sets, and "500" sets are respectively set.

A button 1303 is a button for receiving, from the user, an instruction to print one set of a printed document based on a targeted inspection job. If the button 1303 receives an instruction after the display screen described with reference to FIG. 5A receives an instruction to register a reference image, print processing is executed by the printing apparatus 107, and a reference image switching sheet and a reference image are read by the inspection apparatus 109.

A setting region 1304 is a setting region for receiving, from the user, the designation of a discharge destination of a printed document printed based on an inspection job (i.e., designation of a conveyance destination of a printed document). In accordance with information designated in the setting region 1304, a discharge destination of a printed document is selectively switched. In the example illustrated in FIG. 13, a "finisher" is designated as a discharge destination of a printed document, and an "escape tray" is designated as a discharge destination of the printed document when the printed document is determined to be a defective image in the inspection.

A button 1305 is a button for receiving, from the user, an instruction to feed a reference image from an inserter. When an image printed on a printed document that has been already printed is to be registered as a reference image, the button 1305 is used for feeding the printed document from the inserter. In this case, for example, printing and registration of a reference image are not simultaneously performed, and the image printed on the printed document is determined to be a reference image by the visual check of the user, and used.

When a printed document is to be fed using the button 1305, the user preliminarily places a printed document to be used for reading of a reference image, and a sheet on which a barcode to be used for identifying the reference image is printed, on the inserter tray 321 of the inserter 108. The printed document to be used for reading of the above-described reference image, and the sheet on which the above-described barcode is printed are thereby conveyed to the inspection apparatus 109.

A printed document to be used for reading of a reference image, and a sheet on which a barcode to be used for identifying the reference image is printed may be fed from the sheet feeding unit 230 of the printing apparatus 107 in place of the inserter 108.

A button 1306 is a button for receiving, from the user, an instruction to start printing of an inspection job. If the button 1306 receives an instruction, the external controller 102 inputs an inspection job to the printing apparatus 107 based on setting information designated via the display screen illustrated in FIG. 13. If the button 1306 receives an instruction to start printing of an inspection job, after the button 406 illustrated in FIG. 4 receives an instruction to start an inspection, the external controller 102 inputs print data to the printing apparatus 107, and instructs the printing apparatus 107 to convey the printed document that has been printed, to the inspection apparatus 109. If the printed document is conveyed, the inspection apparatus 109 reads an image printed on the printed document, and executes inspection processing. A button 1307 is a button for canceling the inspection job setting process.

Figure 14:
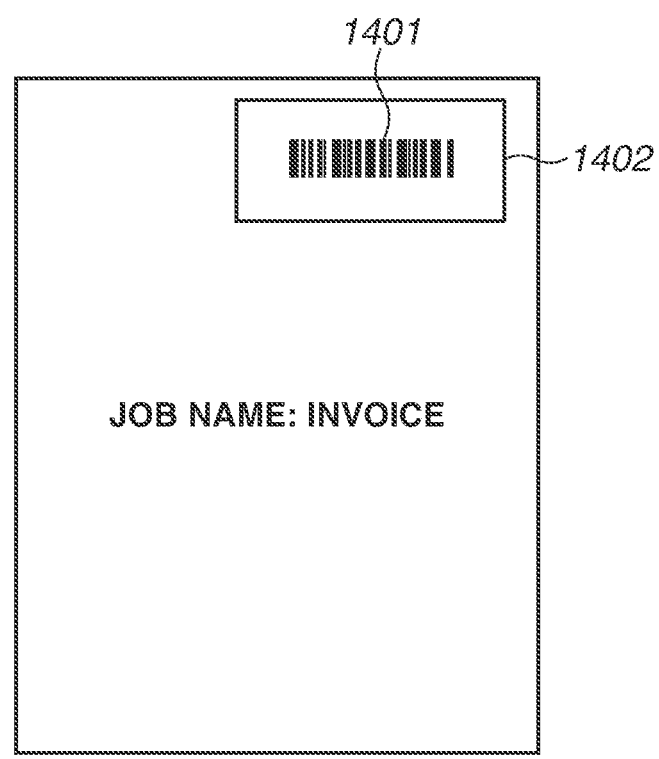
FIG. 14 is a diagram illustrating an example of a reference image switching sheet.

FIG. 14 illustrates an example of a reference image switching sheet to be printed by the printing apparatus 107 at the beginning of a job.

A barcode 1401 is a barcode generated by the external controller 102 when a reference image is registered, and is generated to be unique for each job.

An inspection region 1402 is a region to be inspected whether a barcode exists, in an inspection to be performed by the inspection apparatus 109. When registering a reference image, the inspection apparatus 109 trims the inspection region 1402 from the read image of a reference image switching sheet, and stores the image in the memory 239. At the time of execution of an inspection, the inspection apparatus 109 compares an image at a position in an inspection target image that corresponds to the inspection region 1402, and the barcode image stored in the memory 239 (i.e., the image of the inspection region 1402). In this way, the inspection apparatus 109 determines whether a sheet from which an image has been read is a reference image switching sheet. The above-described barcode comparison is performed for each of a series of barcodes stored in the memory 239. In other words, when a plurality of barcodes is stored, each of the plurality of barcodes is targeted in the above-described comparison.

<Processing>

An example of processing of the image forming system according to the present exemplary embodiment will be described with reference to FIGS. 15 to 21.

Figure 15:
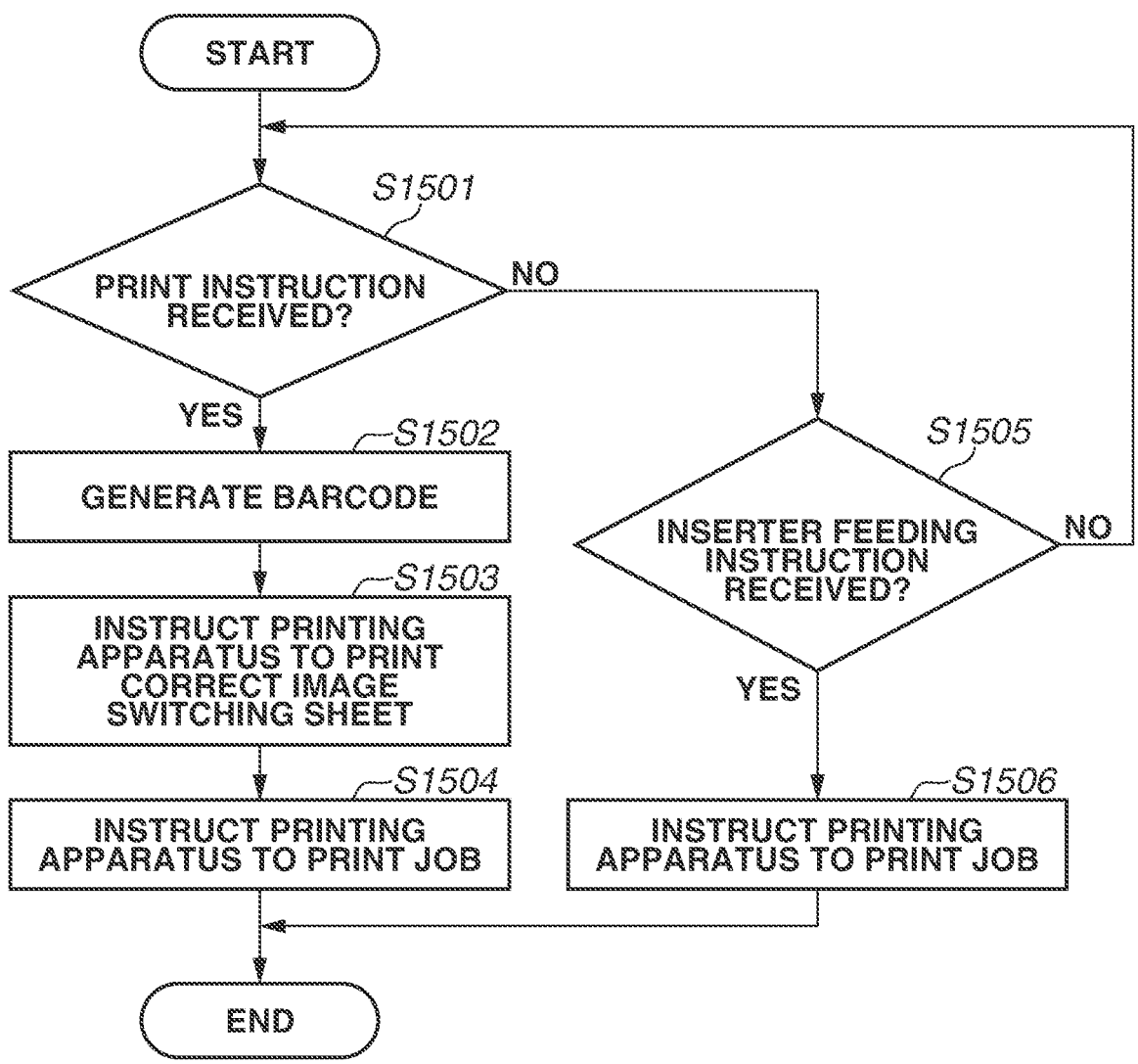
FIG. 15 is a flowchart illustrating an example of processing by an external controller.

First, an example of processing of the external controller 102 related to a print instruction will be described with reference to FIG. 15. The processing illustrated in FIG. 15 is executed by the CPU 208 of the external controller 102, for example.

In step S1501, the external controller 102 determines whether a print instruction of one set of a print job has been received. As a specific example, in a case where the button 1303 illustrated in FIG. 13 is pressed, the external controller 102 may determine that a print instruction of one set of a print job has been received.

In a case where the external controller 102 determines in step S1501 that a print instruction of one set of a print job has been received (YES in step S1501), the external controller 102 advances the processing to step S1502. In step S1502, the external controller 102 generates a uniquely-identifiable barcode, and stores a printed image and the barcode into the memory 209 in association therewith.

In step S1503, the external controller 102 instructs the printing apparatus 107 to print a reference image switching sheet, based on the barcode generated in step S1502.

In step S1504, the external controller 102 inputs print data for one set to the printing apparatus 107, instructs the printing apparatus 107 to execute printing, and ends a series of processes illustrated in FIG. 15.

On the other hand, in a case where the external controller 102 determines in step S1501 that a print instruction of one set of a print job has not been received (NO in step S1501), the external controller 102 advances the processing to step S1505. In step S1505, the external controller 102 determines whether an instruction to feed sheets from an inserter has been received. As a specific example, in a case where the button 1305 illustrated in FIG. 13 is pressed, the external controller 102 may determine that an instruction to feed sheets from an inserter has been received.

In a case where the external controller 102 determines in step S1505 that an instruction to feed sheets from an inserter has been received (YES in step S1505), the external controller 102 advances the processing to step S1506. In step S1506, the external controller 102 instructs the printing apparatus 107 to feed sheets from the inserter in the number of part of sheets corresponding to one set including a reference image switching sheet, and ends a series of processes illustrated in FIG. 15.

On the other hand, in a case where the external controller 102 determines in step S1505 that an instruction to feed sheets from an inserter has not been received (NO in step S1505), the external controller 102 returns the processing to step S1501. In this case, the external controller 102 executes a series of processes illustrated in FIG. 15, again from step S1501.

Figure 16:
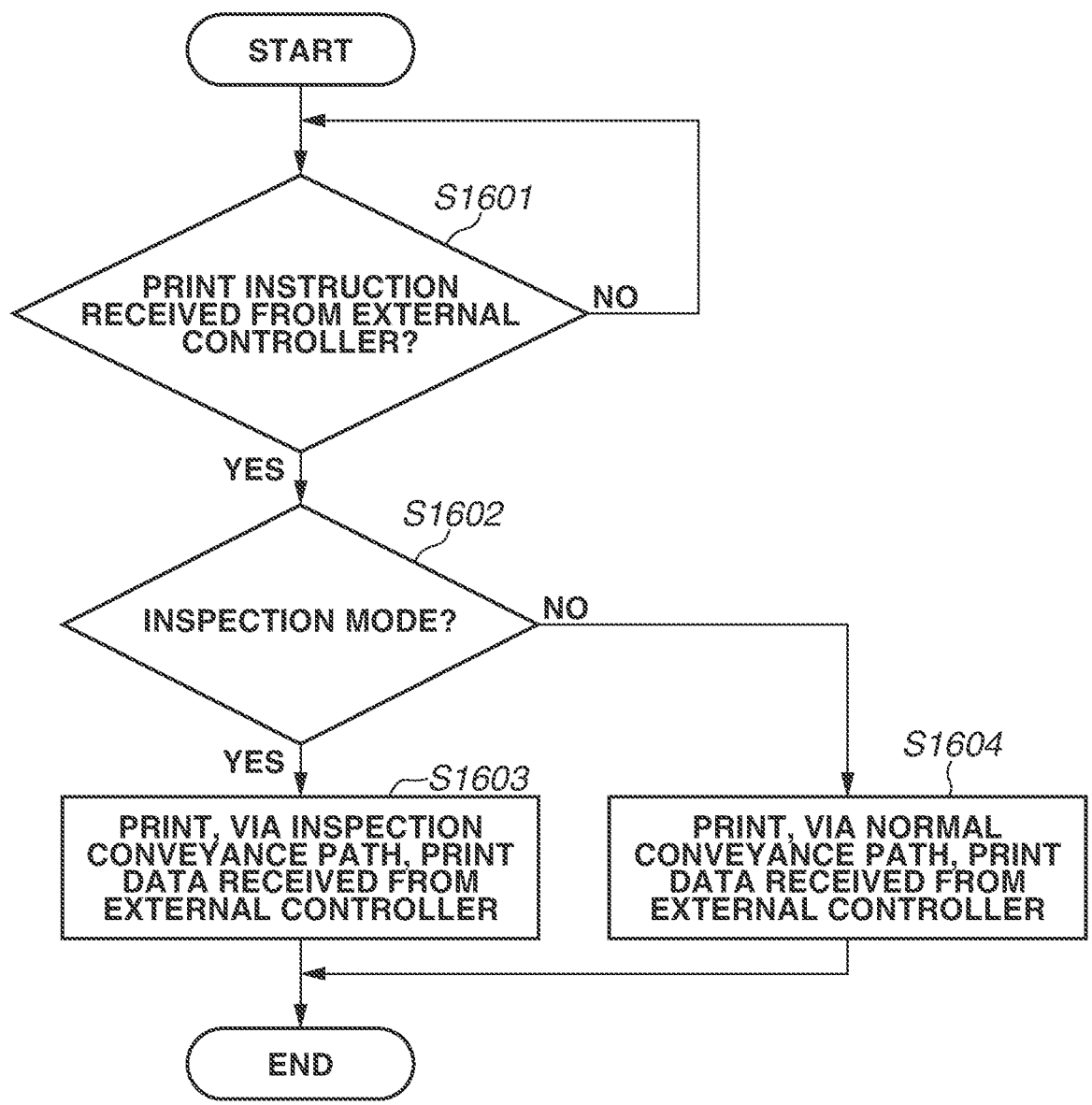
FIG. 16 is a flowchart illustrating an example of processing by a printing apparatus.

Next, an example of processing of the printing apparatus 107 that is related to the registration of a reference image will be described with reference to FIG. 16. The processing illustrated in FIG. 16 is executed by the CPU 222 of the printing apparatus 107, for example.

In step S1601, the printing apparatus 107 waits for the reception of a print instruction from the external controller 102. In a case where the printing apparatus 107 determines in step S1601 that a print instruction has not been received from the external controller 102 (NO in step S1601), the printing apparatus 107 continues to wait for the reception of the instruction. By executing the processing in steps S1503, S1504, and S1506 illustrated in FIG. 15, a print instruction is transmitted from the external controller 102 to the printing apparatus 107.

In a case where the printing apparatus 107 determines in step S1601 that a print instruction has been received from the external controller 102 (YES in step S1601), the printing apparatus 107 advances the processing to step S1602. In step S1602, the printing apparatus 107 determines whether the current mode is an operation mode related to an inspection of a printed document (hereinafter, also referred to as an "inspection mode"). As a specific example, based on information notified from the inspection apparatus 109, the printing apparatus 107 may determine whether the current mode is an inspection mode. As a matter of course, the determination method is not specifically limited as long as the printing apparatus 107 can determine whether the current mode is an inspection mode. For example, the printing apparatus 107 may determine whether the current mode is an inspection mode, using information regarding a job in the print instruction from the external controller 102.

In a case where the printing apparatus 107 determines in step S1602 that the current mode is an inspection mode (YES in step S1602), the printing apparatus 107 advances the processing to step S1603. In step S1603, based on print data received from the external controller 102, the printing apparatus 107 executes print processing in such a manner that a sheet is conveyed through an inspection conveyance path, and ends a series of processes illustrated in FIG. 16.

On the other hand, in a case where the printing apparatus 107 determines in step S1602 that the current mode is not an inspection mode (NO in step S1602), the printing apparatus 107 advances the processing to step S1604. In step S1604, based on print data received from the external controller 102, the printing apparatus 107 executes print processing in such a manner that a sheet is conveyed through a normal conveyance path, and ends a series of processes illustrated in FIG. 16.

Figure 17:
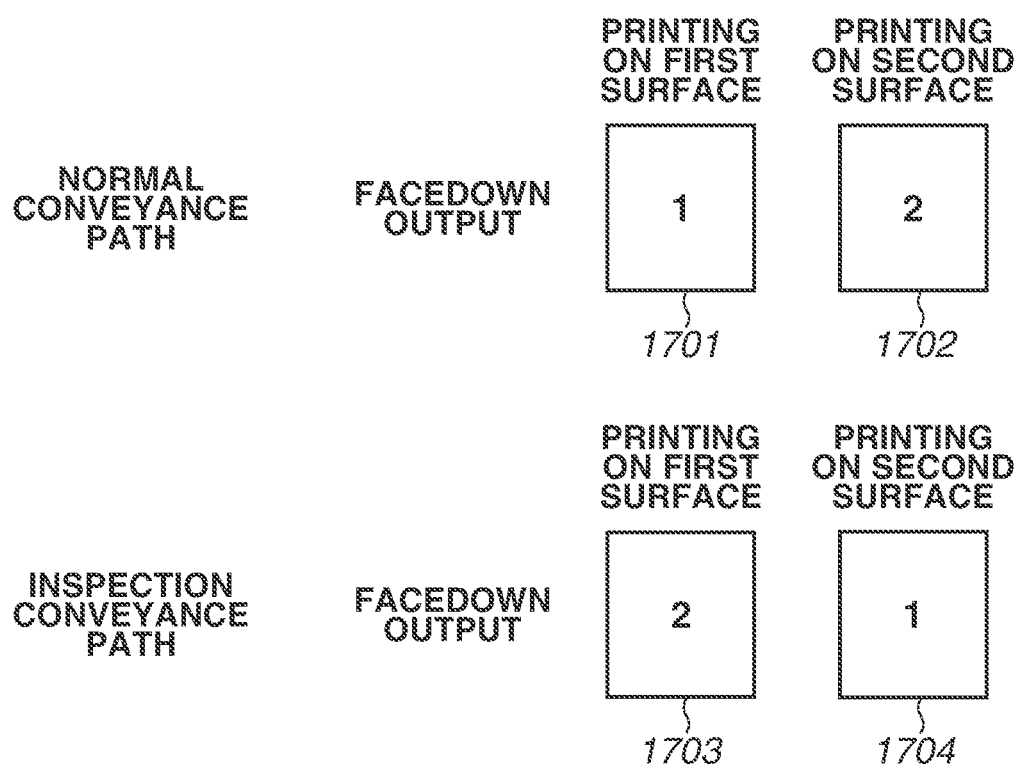
FIG. 17 is a diagram illustrating an example of facedown printing.

Facedown printing through each of an inspection conveyance path and a normal conveyance path will be individually described with reference to FIG. 17.

First, a case of facedown printing through an inspection conveyance path that corresponds to step S1603 illustrated in FIG. 16 will be described.

The printing apparatus 107 separates one uppermost sheet of sheets stored in the sheet feeding deck 301 or 302, and conveys the sheet to the sheet conveyance path 303. In addition, toner images are formed by the development stations 304 to 307. The formed toner images are primarily transferred onto the intermediate transfer belt 308, and transferred from the intermediate transfer belt 308 at the secondary transfer position 309 onto the sheet conveyed from the sheet conveyance path 303.

The sheet having passed through the fixing unit 311 is conveyed to the sheet conveyance path 315 through the sheet conveyance path 312.

At this time, in a case where an image formation mode is set to a one-sided printing mode, the conveyed sheet is not conveyed to the sheet reversing path 316, but is conveyed to the sheet conveyance path 315.

On the other hand, in a case where an image formation mode is set to a two-sided printing mode, the conveyed sheet is conveyed to the sheet reversing path 316, and the front surface and the rear surface are reversed by the sheet reversing path 316. Then, the sheet is conveyed to the two-sided conveyance path 317, and image transfer onto the second surface is performed at the secondary transfer position 309. At this time, in the inspection conveyance path, as illustrated in FIG. 17, in a case where a page order of both surfaces is the first page and the second page, the second page is transferred onto a first surface 1703, and the first page is transferred onto a second surface 1704.

The sheet having passed through the inserter 108 is conveyed to the inspection apparatus 109. The sheet having passed through the inspection apparatus 109 is input to the stacker 110 through the sheet conveyance path 344. The sheet input to the stacker 110 is conveyed to the sheet conveyance path 344 via the reversing unit 349 for reversing a sheet, and then conveyed to the subsequent apparatus (e.g., the finisher 111) through the sheet conveyance path 348.

The finisher 111 includes the discharge trays 351 and 352. In a case where finishing processing such as stapling is not to be performed, the sheet input to the finisher 111 is output to the discharge tray 351 through the sheet conveyance path 353. On the other hand, in a case where finishing processing such as stapling is to be performed, the sheet input to the finisher 111 is conveyed to the processing unit 355 through the sheet conveyance path 354. The sheet conveyed to the processing unit 355 is subjected to finishing processing designated by the user and executed by the processing unit 355, and is output to the discharge tray 352.

Next, a case of facedown printing through a normal conveyance path that corresponds to step S1604 illustrated in FIG. 16 will be described.

The printing apparatus 107 separates one uppermost sheet of sheets stored in the sheet feeding deck 301 or 302, and conveys the sheet to the sheet conveyance path 303. In addition, toner images are formed by the development stations 304 to 307. The formed toner images are primarily transferred onto the intermediate transfer belt 308, and transferred from the intermediate transfer belt 308 at the secondary transfer position 309 onto the sheet conveyed from the sheet conveyance path 303.

The sheet having passed through the fixing unit 311 is conveyed to the sheet conveyance path 315 through the sheet conveyance path 312.

At this time, in a case where an image formation mode is set to a one-sided printing mode, the conveyed sheet is not conveyed to the sheet reversing path 316, but is conveyed to the sheet conveyance path 315.

On the other hand, in a case where an image formation mode is set to a two-sided printing mode, the conveyed sheet is conveyed to the sheet reversing path 316, and the front surface and the rear surface are reversed by the sheet reversing path 316. Then, the sheet is conveyed to the two-sided conveyance path 317, and image transfer onto the second surface is performed at the secondary transfer position 309. At this time, on the normal conveyance path, as illustrated in FIG. 17, in a case where a page order of both surfaces is the first page and the second page, the first page is transferred onto a first surface 1701, and the second page is transferred onto a second surface 1702.

The sheet having passed through the inserter 108 is conveyed to the inspection apparatus 109. The sheet having passed through the inspection apparatus 109 is input to the stacker 110 through the sheet conveyance path 344. The sheet input to the stacker 110 is conveyed to the sheet conveyance path 344, and then conveyed to the subsequent apparatus (e.g., the finisher 111) through the sheet conveyance path 348.

The finisher 111 includes the discharge trays 351 and 352. In a case where finishing processing such as stapling is not to be performed, the sheet input to the finisher 111 is output to the discharge tray 351 through the sheet conveyance path 353. On the other hand, in a case where finishing processing such as stapling is to be performed, the sheet input to the finisher 111 is conveyed to the processing unit 355 through the sheet conveyance path 354. The sheet conveyed to the processing unit 355 is subjected to finishing processing designated by the user and executed by the processing unit 355, and is output to the discharge tray 352.

An apparatus that switches a path through which a sheet is to be conveyed, to either an inspection conveyance path or a normal conveyance path depending on whether the current mode is an inspection mode (i.e., whether an inspection is to be performed), similar to the above-described printing apparatus 107, corresponds to an example of an information processing apparatus according to the present exemplary embodiment.

Figure 18:
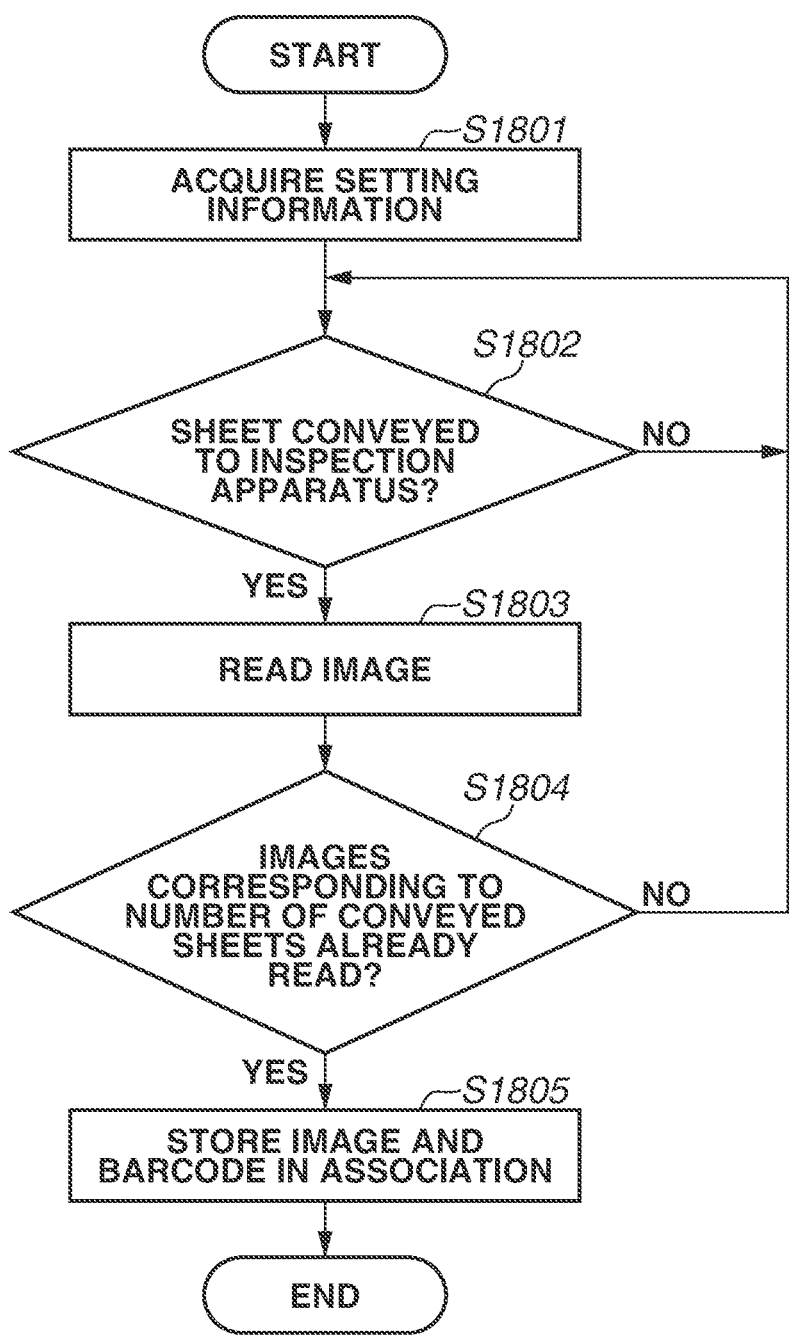
FIG. 18 is a flowchart illustrating an example of processing of an inspection apparatus.

Next, an example of processing of the inspection apparatus 109 that is related to the registration of a reference image will be described with reference to FIG. 18. The processing illustrated in FIG. 18 is executed by the CPU 238 of the inspection apparatus 109, for example.

In step S1801, the inspection apparatus 109 acquires setting information regarding printing. The setting information is acquired based on input received from the user via the registration screen described with reference to FIG. 5A, for example. The setting information acquired in step S1801 includes information regarding a sheet size designated via the setting region 503, and a sheet type designated via the setting region 504, for example.

In step S1802, the inspection apparatus 109 waits for a sheet to be conveyed to the inspection apparatus 109. In a case where the inspection apparatus 109 determines in step S1802 that a sheet has not been conveyed to the inspection apparatus 109 (NO in step S1802), the inspection apparatus 109 continues to wait for the conveyance of a sheet.

In a case where the inspection apparatus 109 determines in step S1802 that a sheet has been conveyed to the inspection apparatus 109 (YES in step S1802), the inspection apparatus 109 advances the processing to step S1803. In step S1803, the inspection apparatus 109 reads an image on the conveyed sheet using the cameras 331 and 332, and stores the read image into the memory 239. The image stored in the memory 239 is displayed in the display region 601 of the screen illustrated in FIG. 6A, for example.

In step S1804, the inspection apparatus 109 determines whether images corresponding to the number of sheets conveyed in step S1802 have already been read.

In a case where the inspection apparatus 109 determines in step S1804 that images corresponding to the number of conveyed sheets have not been read yet (NO in step S1804), the inspection apparatus 109 returns the processing to step S1802. In this case, the inspection apparatus 109 executes again the processing in step S1802 and the subsequent steps.

Then, in a case where the inspection apparatus 109 determines in step S1804 that images corresponding to the number of conveyed sheets have already been read (YES in step S1804), the inspection apparatus 109 advances the processing to step S1805.

In step S1805, the inspection apparatus 109 trims a barcode inspection region of a reference image switching sheet stored in the memory 239, and associates the barcode inspection region with an inspection target image. Then, the inspection apparatus 109 stores the above-described barcode and the above-described image that have been associated with each other, into the memory 239 together with the setting information (e.g., sheet size and sheet type) acquired in step S1801, and ends a series of processes illustrated in FIG. 18.

Figure 19:
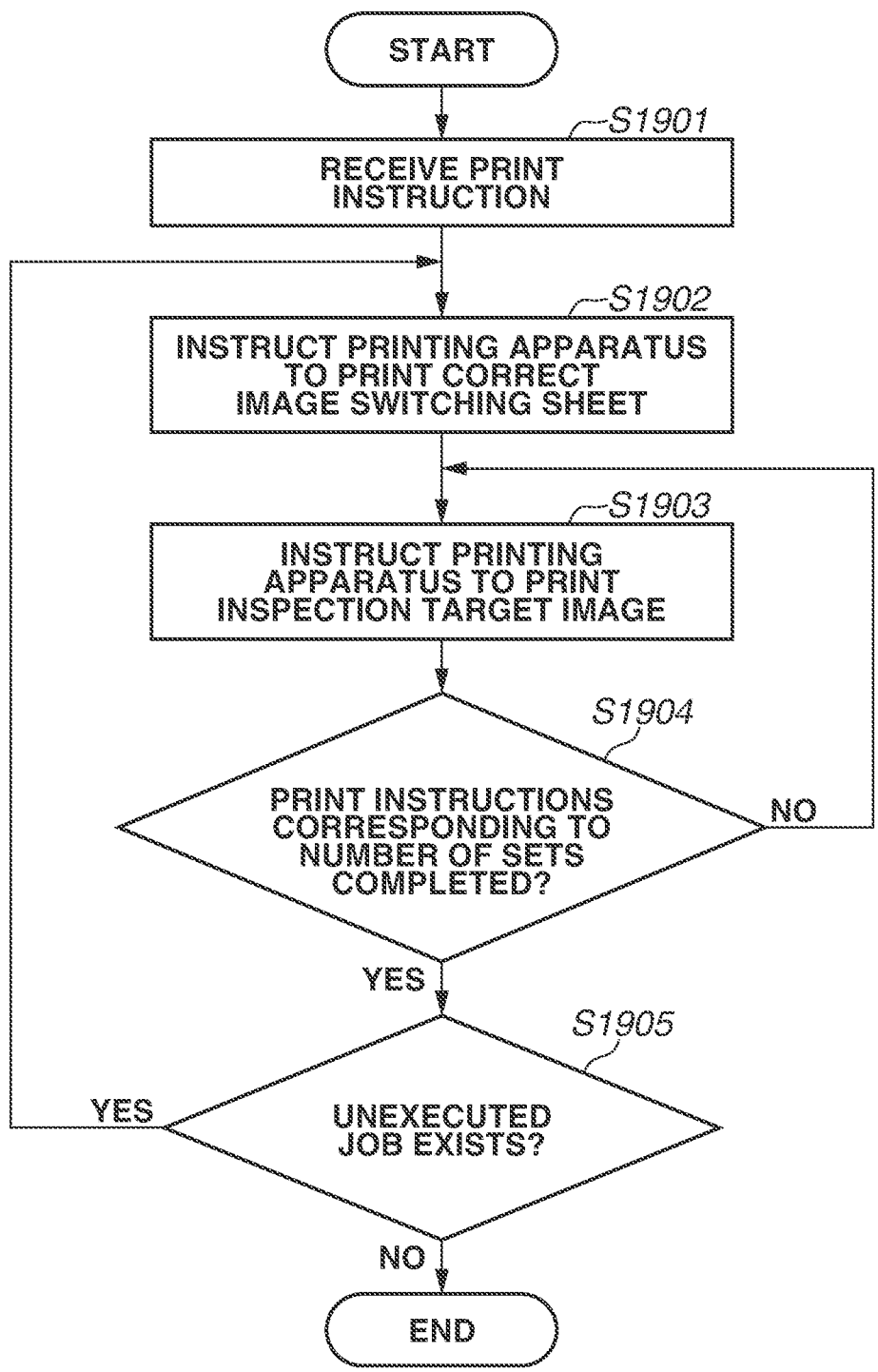
FIG. 19 is a flowchart illustrating an example of processing by an external controller.

An example of processing of the external controller 102 that is related to an inspection of a printed document will be described with reference to FIG. 19. The processing illustrated in FIG. 19 is executed by the CPU 208 of the external controller 102, for example.

In step S1901, the external controller 102 receives a print instruction from the user. As a specific example, in a case where the button 1306 of the setting screen illustrated in FIG. 13 is pressed, the external controller 102 may determine that a print instruction has been received from the user. If the external controller 102 receives a print instruction from the user, the external controller 102 acquires setting information regarding the number of sets of a job. At this time, in a case where the external controller 102 has received an instruction to execute jobs of a plurality of types, the external controller 102 acquires setting information regarding the number of sets for each job.

In step S1902, the external controller 102 instructs the printing apparatus 107 to print a reference image switching sheet.

In step S1903, the external controller 102 instructs the printing apparatus 107 to print an inspection target image.

In step S1904, the external controller 102 determines whether print instructions corresponding to the designated number of sets have been completed.

In a case where the external controller 102 determines in step S1904 that print instructions corresponding to the designated number of sets have not been completed (NO in step S1904), the external controller 102 returns the processing to step S1903. In this case, in step S1903, the external controller 102 issues an instruction for the uncompleted printing to the printing apparatus 107.

Then, in a case where the external controller 102 determines in step S1904 that print instructions corresponding to the designated number of sets have been completed (YES in step S1904), the external controller 102 advances the processing to step S1905.

In step S1905, the external controller 102 determines whether an unexecuted job exists.

In a case where the external controller 102 determines in step S1905 that an unexecuted job exists (YES in step S1905), the external controller 102 returns the processing to step S1902. In this case, the external controller 102 executes again the processing in step S1902 and the subsequent steps, on the unexecuted job.

Then, in a case where the external controller 102 determines in step S1905 that an unexecuted job does not exist (NO in step S1905), the external controller 102 ends a series of processes illustrated in FIG. 19.

Figure 20:
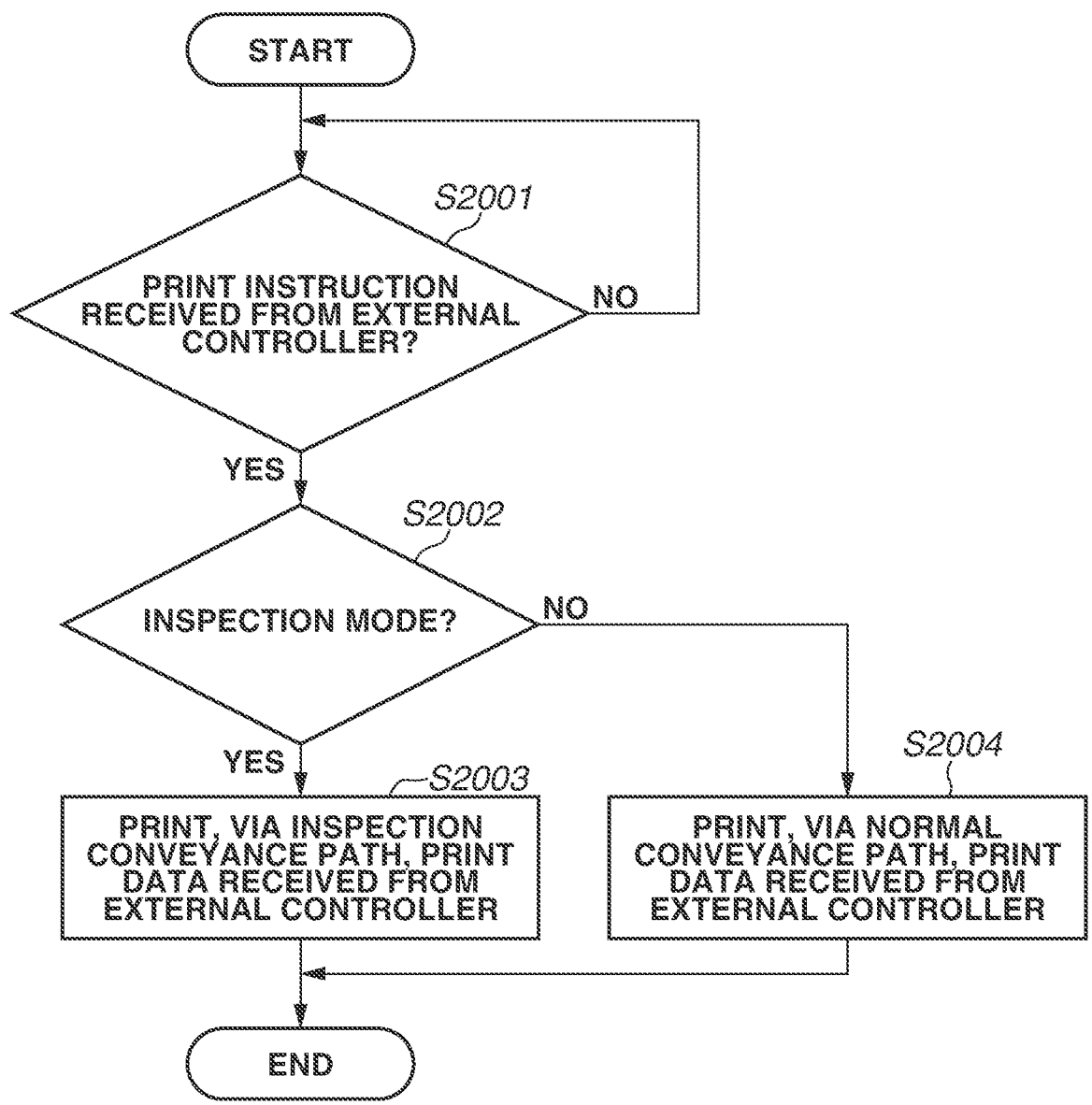
FIG. 20 is a flowchart illustrating an example of processing by a printing apparatus.

Next, an example of processing of the printing apparatus 107 that is related to an inspection of a printed document will be described with reference to FIG. 20. The processing illustrated in FIG. 20 is executed by the CPU 222 of the printing apparatus 107, for example.

In step S2001, the printing apparatus 107 waits for the reception of a print instruction from the external controller 102. In a case where the printing apparatus 107 determines in step S2001 that a print instruction has not been received from the external controller 102 (NO in step S2001), the printing apparatus 107 continue to wait for the reception of the instruction. By executing the processing in step S1903 illustrated in FIG. 19, a print instruction is transmitted from the external controller 102 to the printing apparatus 107.

In a case where the printing apparatus 107 determines in step S2001 that a print instruction has been received from the external controller 102 (YES in step S2001), the printing apparatus 107 advances the processing to step S2002. In step S2002, the printing apparatus 107 determines whether the current mode is an inspection mode. As a specific example, based on information notified from the inspection apparatus 109, the printing apparatus 107 may determine whether the current mode is an inspection mode. As a matter of course, the determination method is not specifically limited as long as the printing apparatus 107 can determine whether the current mode is an inspection mode. For example, the printing apparatus 107 may determine whether the current mode is an inspection mode, using information regarding a job in the print instruction from the external controller 102.

In a case where the printing apparatus 107 determines in step S2002 that the current mode is an inspection mode (YES in step S2002), the printing apparatus 107 advances the processing to step S2003. In step S2003, based on print data received from the external controller 102, the printing apparatus 107 executes print processing in such a manner that a sheet is conveyed through an inspection conveyance path, and ends a series of processes illustrated in FIG. 20.

On the other hand, in a case where the printing apparatus 107 determines in step S2002 that the current mode is not an inspection mode (NO in step S2002), the printing apparatus 107 advances the processing to step S2004. In step S2004, based on print data received from the external controller 102, the printing apparatus 107 executes print processing in such a manner that a sheet is conveyed through a normal conveyance path, and ends a series of processes illustrated in FIG. 20.

Figure 21:
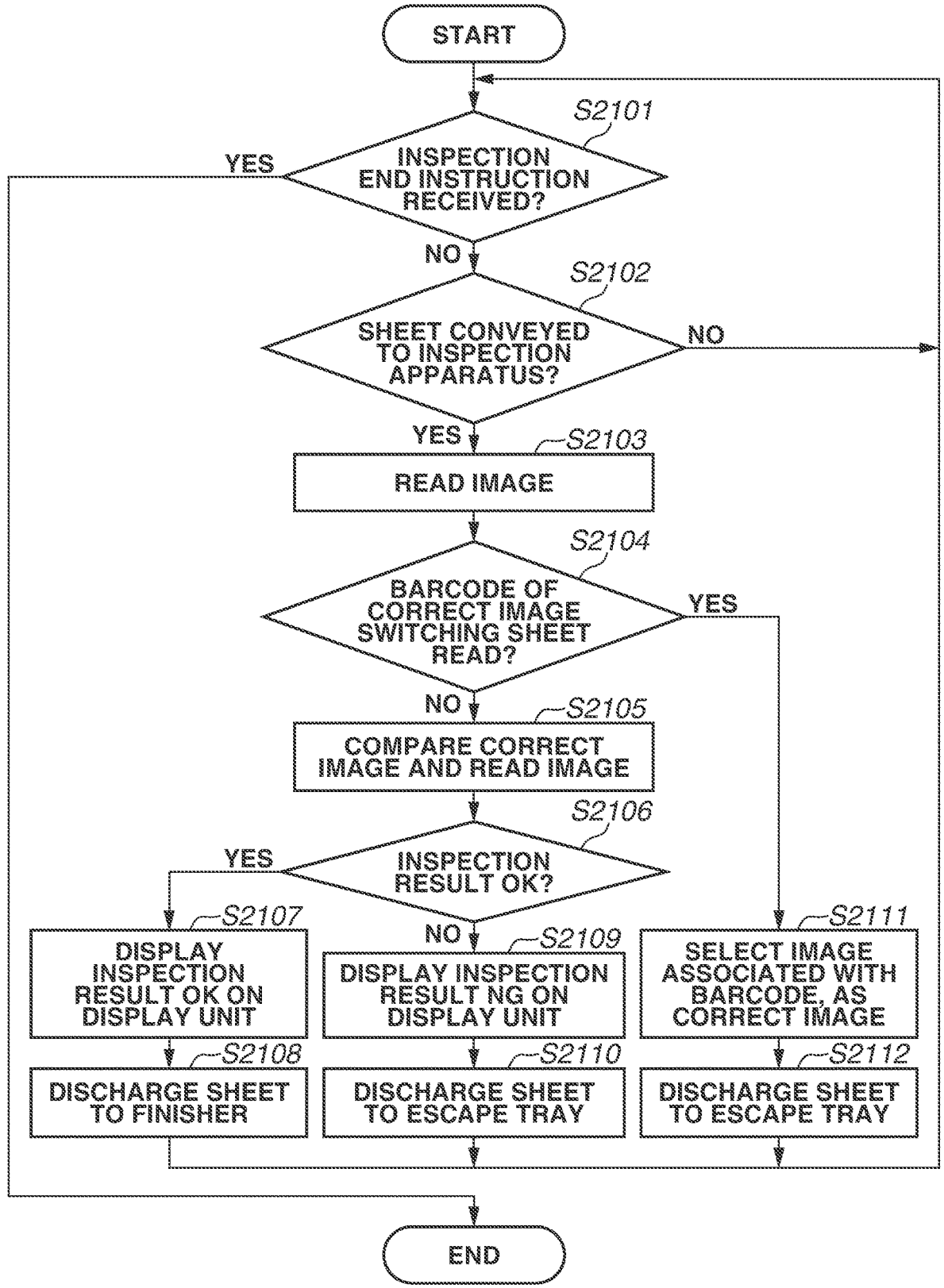
FIG. 21 is a flowchart illustrating an example of processing by an inspection apparatus.

Next, an example of processing of the inspection apparatus 109 that is related to an inspection of a printed document will be described with reference to FIG. 21. The processing illustrated in FIG. 21 is executed by the CPU 238 of the inspection apparatus 109, for example.

In step S2101, the inspection apparatus 109 determines whether an inspection end instruction of a printed document has been received. As a specific example, in a case where the button 1303 of the screen illustrated in FIG. 11A is pressed, the inspection apparatus 109 may determine that an inspection end instruction of a printed document has been received from the user.

In a case where the inspection apparatus 109 determines in step S2101 that an inspection end instruction of a printed document has not been received (NO in step S2101), the inspection apparatus 109 advances the processing to step S2102. In step S2102, the inspection apparatus 109 determines whether a sheet has been conveyed to the inspection apparatus 109 itself.

In a case where the inspection apparatus 109 determines in step S2102 that a sheet has not been conveyed to the inspection apparatus 109 (NO in step S2102), the inspection apparatus 109 returns the processing to step S2101. In this case, the inspection apparatus 109 executes again the processing in step S2101 and the subsequent steps.

On the other hand, in a case where the inspection apparatus 109 determines in step S2102 that a sheet has been conveyed to the inspection apparatus 109 (YES in step S2102), the inspection apparatus 109 advances the processing to step S2103. In step S2103, the inspection apparatus 109 reads an image from the conveyed sheet using the cameras 331 and 332, and stores the read image into the memory 239. The image stored in the memory 239 is displayed in the display region 1101 of the screen illustrated in FIG. 11A, for example.

In step S2104, the inspection apparatus 109 determines whether the sheet from which the image has been read in step S2103 is a reference image switching sheet.

In a case where the inspection apparatus 109 determines in step S2104 that the sheet from which the image has been read is a reference image switching sheet (YES in step S2104), the inspection apparatus 109 advances the processing to step S2111. In step S2111, the inspection apparatus 109 selects an image associated with the barcode stored in the memory 239, as a reference image.

In step S2112, the inspection apparatus 109 instructs the stacker 110 to discharge the reference image switching sheet to the escape tray 346.

Then, the inspection apparatus 109 returns the processing to step S2101. In this case, the inspection apparatus 109 executes again the processing in step S2101 and the subsequent steps.

On the other hand, in a case where the inspection apparatus 109 determines in step S2104 that the sheet from which the image has been read is not a reference image switching sheet (NO in step S2104), the inspection apparatus 109 advances the processing to step S2105. In step S2105, the inspection apparatus 109 compares the image read in step S2103, and a reference image. The reference image to be compared is based on a setting registered in the inspection apparatus 109 by pressing the button 403 of the screen illustrated in FIG. 4, for example. Items to be compared in step S2103 are based on an inspection level designated in the setting region 901, and an inspection item designated in the setting region 902 on the setting screen illustrated in FIG. 9, for example.

In step S2106, based on a result of comparison in step S2105, the inspection apparatus 109 determines whether an inspection result indicates OK (i.e., whether a targeted image is a reference image or a defective image).

In a case where the inspection apparatus 109 determines in step S2106 that an inspection result indicates OK (i.e., in a case where a targeted image is a reference image) (YES in step S2106), the inspection apparatus 109 advances the processing to step S2107. In step S2107, the inspection apparatus 109 displays, on the display unit 241, an inspection result indicating OK. For example, the screen illustrated in FIG. 11A illustrates an example of a screen displayed by the processing in step S2107.

In step S2108, the inspection apparatus 109 instructs the printing apparatus 107 to discharge the printed document to the finisher 111. A discharge destination to which the printed document is discharged based on the instruction (i.e., a conveyance destination of the printed document) is based on information designated in the setting region 1304 of the setting screen illustrated in FIG. 13, for example.

Then, the inspection apparatus 109 returns the processing to step S2101. In this case, the inspection apparatus 109 executes again the processing in step S2101 and the subsequent steps.

On the other hand, in a case where the inspection apparatus 109 determines in step S2106 that an inspection result indicates NG (i.e., in a case where a targeted image is a defective image) (NO in step S2106), the inspection apparatus 109 advances the processing to step S2109. In step S2109, the inspection apparatus 109 displays an inspection result indicating NG, on the display unit 241. For example, the screen illustrated in FIG. 11B illustrates an example of a screen displayed by the processing in step S2109.

In step S2110, the inspection apparatus 109 instructs the printing apparatus 107 to discharge the printed document to the escape tray 346. A discharge destination to which the printed document is discharged based on the instruction is based on information designated in the setting region 1304 of the setting screen illustrated in FIG. 13, as a discharge destination of sheets rejected in an inspection, for example.

Then, the inspection apparatus 109 returns the processing to step S2101. In this case, the inspection apparatus 109 executes again the processing in step S2101 and the subsequent steps.

Then, in a case where the inspection apparatus 109 determines in step S2101 that an inspection end instruction of a printed document has been received (YES in step S2101), the inspection apparatus 109 ends a series of processes illustrated in FIG. 21.

According to the present exemplary embodiment, it becomes possible to control a discharge destination of a printed document that is suitable for an inspection result of the printed document, in a more desirable form.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-177985, filed Oct. 23, 2020, which is hereby incorporated by reference herein in its entirety.

What is claimed is:

1. A printing system comprising:
a printer configured to print an image on a recording medium; and
one or more controllers including one or more processors where the one or more controllers are configured to perform operations including:
printing the image in the recording medium by the printer,
determining, based on a reference image, a read image that is obtained by reading the image printed on the recording medium, and
performing control,
wherein the recording medium that is determined is controlled to be discharged to a discharge destination by passing along a first conveyance path that includes a predetermined conveyance path, and
wherein the recording medium that is not determined is controlled to be discharged to a discharge destination by passing along a second conveyance path that does not include the predetermined conveyance path.

2. The printing system according to claim 1, wherein, in a case where the determination is performed, performing operations includes performing operations including switching a conveyance path of the recording medium in such a manner that the recording medium passes through a reversing process to reverse a front surface and a rear surface of the recording medium.

3. The printing system according to claim 2,
wherein, in a case where the determination is performed, printing includes printing the image on one of a front surface and a rear surface of the recording medium surface, and
wherein, in a case where the determination is not performed, printing includes printing the image on the other of the front surface and the rear surface of the recording medium.

4. The printing system according to claim 1, wherein the first conveyance path is longer than the second conveyance path.

5. The printing system according to claim 1, wherein the predetermined conveyance path includes a reversing device configured to reverse the recording medium.

6. The printing system according to claim 1, wherein performing control includes performing control such that the recording medium that is determined is discharged to discharge destinations that differ depending on determination results.

7. An information processing apparatus comprising:
one or more controllers including one or more processors where the one or more controllers are configured to perform operations including:
printing an image in a recording medium by a printer,
determining, based on a reference image, a read image that is obtained by reading the image printed on the recording medium, and
performing control,
wherein the recording medium that is determined is controlled to be discharged to a discharge destination by passing along a first conveyance path that includes a predetermined conveyance path, and
wherein the recording medium that is not determined is controlled to be discharged to a discharge destination by passing along a second conveyance path that does not include the predetermined conveyance path.

8. A method for a printing system having a printer configured to print an image on a recording medium, the method comprising:
printing the image in the recording medium by the printer;
determining, based on a reference image, a read image that is obtained by reading the image printed on the recording medium; and
performing control,
wherein the recording medium that is determined is controlled to be discharged to a discharge destination by passing along a first conveyance path that includes a predetermined conveyance path, and
wherein the recording medium that is not determined is controlled to be discharged to a discharge destination by passing along a second conveyance path that does not include the predetermined conveyance path.

9. The method according to claim 8, wherein the first conveyance path is longer than the second conveyance path.

10. The method according to claim 8, wherein the predetermined conveyance path includes a reversing device configured to reverse the recording medium.

11. The method according to claim 8, wherein performing control includes performing control such that the recording medium that is determined is discharged to discharge destinations that differ depending on determination results.

* * * * *